United States Patent
Mischel, Jr. et al.

(10) Patent No.: US 12,232,217 B1
(45) Date of Patent: *Feb. 18, 2025

(54) APPARATUSES AND METHODS FOR STREAMING AUDIO AND VIDEO

(71) Applicant: ELECTRIC MIRROR, LLC, Everett, WA (US)

(72) Inventors: James V. Mischel, Jr., Seattle, WA (US); James Vernon Mischel, Sr., Arlington, WA (US); Michael Martin Uhl, Seattle, WA (US); Steven M Swedenburg, Wasilla, AK (US)

(73) Assignee: ELECTRIC MIRROR, LLC, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,665

(22) Filed: Oct. 14, 2022

Related U.S. Application Data

(63) Continuation of application No. 17/223,021, filed on Apr. 6, 2021, now Pat. No. 11,496,887, which is a continuation of application No. 16/656,504, filed on Oct. 17, 2019, now Pat. No. 10,972,905, which is a continuation of application No. 15/611,477, filed on Jun. 1, 2017, now Pat. No. 10,462,651, which is a continuation of application No. 13/815,901, filed on Mar. 15, 2013, now Pat. No. 9,686,673, which is a continuation-in-part of application No. 13/068,778, filed on May 18, 2011, now Pat. No. 8,835,789.

(60) Provisional application No. 61/395,898, filed on May 18, 2010.

(51) Int. Cl.
*H04W 4/80* (2018.01)
*H04W 8/24* (2009.01)
*H04M 1/72412* (2021.01)

(52) U.S. Cl.
CPC ............ *H04W 8/24* (2013.01); *H04W 4/80* (2018.02); *H04M 1/72412* (2021.01)

(58) Field of Classification Search
CPC ...... H04W 8/24; H04W 4/80; H04M 1/72412
See application file for complete search history.

(56) References Cited

U.S. PATENT DOCUMENTS

| 7,579,939 | B2* | 8/2009 | Schofield | ............ B60R 11/0247 |
| | | | | 701/487 |
| 7,579,940 | B2* | 8/2009 | Schofield | ................. H04N 7/18 |
| | | | | 701/487 |
| 7,912,646 | B2* | 3/2011 | McCarthy | ................. B60R 1/04 |
| | | | | 362/494 |
| 8,044,776 | B2* | 10/2011 | Schofield | .................. B60R 1/29 |
| | | | | 348/148 |
| 8,099,247 | B2* | 1/2012 | Mischel, Jr. | ............ G09F 13/12 |
| | | | | 362/135 |

(Continued)

*Primary Examiner* — Hai V Nguyen
(74) *Attorney, Agent, or Firm* — PELOQUIN, PLLC; Mark S. Peloquin, Esq.

(57) ABSTRACT

A wirelessly enabled mirror includes a mirror, a wireless data system, and a data output interface. The mirror has a front side and a back side. The wireless data system includes a wireless data module. The wireless data system is fixed to the back side of the mirror. The wireless data module is configured to communicate with a user device and to receive wireless data from the user device. The data output interface is configured to receive data from the wireless data module, and the data is derived from a wireless stream of data.

33 Claims, 19 Drawing Sheets

(56) References Cited

U.S. PATENT DOCUMENTS

| | | | | |
|---|---|---|---|---|
| 8,787,590 | B2* | 7/2014 | Watson | H04M 1/6091 381/86 |
| 8,835,789 | B2* | 9/2014 | Mischel, Jr. | H03K 17/78 200/600 |
| 8,880,360 | B2* | 11/2014 | Mischel, Jr. | C03C 17/00 362/135 |
| 9,686,673 | B2* | 6/2017 | Mischel, Jr. | H04W 4/80 |
| 9,817,526 | B2* | 11/2017 | Mischel, Jr. | G06F 3/0443 |
| 10,106,896 | B2* | 10/2018 | Mischel, Jr. | B24C 1/00 |
| 10,448,762 | B2* | 10/2019 | Murphy | E03D 5/105 |
| 10,462,651 | B1* | 10/2019 | Mischel, Jr. | H04N 21/43637 |
| 10,634,910 | B2* | 4/2020 | Mischel, Jr. | G02B 1/14 |
| 10,663,938 | B2* | 5/2020 | Rexach | G06F 3/167 |
| 10,925,396 | B2* | 2/2021 | Murphy | A47G 1/24 |
| 10,968,523 | B1* | 4/2021 | Mischel, Jr. | A47G 1/02 |
| 10,972,905 | B1* | 4/2021 | Mischel, Jr. | H04W 4/80 |
| 11,026,497 | B2* | 6/2021 | Yang | A45D 42/10 |
| 11,083,344 | B2* | 8/2021 | Tsibulevskiy | A45D 42/24 |
| 11,099,540 | B2* | 8/2021 | Bradley | G05B 19/048 |
| 11,142,927 | B2* | 10/2021 | Root | E05B 65/087 |
| 11,496,887 | B1* | 11/2022 | Mischel, Jr. | H04W 4/80 |
| 2002/0196999 | A1* | 12/2002 | Kim | G02B 6/32 385/16 |
| 2003/0095739 | A1* | 5/2003 | Kim | G02B 6/3588 385/33 |
| 2004/0246607 | A1* | 12/2004 | Watson | B60R 1/12 359/872 |
| 2007/0159316 | A1* | 7/2007 | Mischel, Jr. | A47G 1/02 340/461 |
| 2007/0171037 | A1* | 7/2007 | Schofield | B60R 1/26 340/438 |
| 2007/0291383 | A1* | 12/2007 | Watson | H04M 1/6091 359/872 |
| 2008/0212215 | A1* | 9/2008 | Schofield | B60Q 1/543 345/173 |
| 2009/0102296 | A1* | 4/2009 | Greene | H01Q 1/243 307/149 |
| 2012/0293723 | A1* | 11/2012 | Mischel, Jr. | G02B 27/0101 348/739 |
| 2014/0066048 | A1* | 3/2014 | Swedenburg | H04W 8/24 709/217 |
| 2014/0307180 | A1* | 10/2014 | Mischel, Jr. | G06F 3/0443 349/12 |
| 2015/0036327 | A1* | 2/2015 | Uhl | A45D 42/10 362/135 |
| 2015/0203970 | A1* | 7/2015 | Mischel, Jr. | C03C 17/00 134/41 |
| 2015/0205110 | A1* | 7/2015 | Mischel, Jr. | G02B 27/1073 359/630 |
| 2015/0316820 | A1* | 11/2015 | Duston | G02F 1/13439 349/138 |
| 2016/0327787 | A1* | 11/2016 | Mischel, Sr. | G01J 1/44 |
| 2018/0003971 | A1* | 1/2018 | Mischel, Jr. | G02B 27/144 |
| 2020/0224458 | A1* | 7/2020 | Root | E05B 65/087 |
| 2021/0361122 | A1* | 11/2021 | Tsibulevskiy | G02F 1/0121 |

* cited by examiner

APPARATUSES AND METHODS FOR STREAMING AUDIO AND VIDEO

RELATED APPLICATIONS

This Patent Application is a continuation of U.S. Non-Provisional patent application Ser. No. 17/223,021, which is a continuation of U.S. Non-Provisional patent application Ser. No. 16/656,504, filed on Oct. 17, 2019, now U.S. Pat. No. 10,972,905, which is a continuation of U.S. Non-Provisional patent application Ser. No. 15/611,477 filed on Jun. 1, 2017, now U.S. Pat. No. 10,462,651, which is a continuation of U.S. Non-Provisional patent application Ser. No. 13/815,901 filed on Mar. 15, 2013, now U.S. Pat. No. 9,686,673, which is a continuation-in-part of U.S. Non-Provisional patent application Ser. No. 13/068,778 filed on May 18, 2011, now U.S. Pat. No. 8,835,789, which claims priority from U.S. Provisional Patent Application Ser. No. 61/395,898 filed on May 18, 2010 titled "APPARATUSES AND METHODS FOR COMBINING MIRRORS WITH ELECTRONICS" and is hereby incorporated by reference into the present application.

BACKGROUND

1. Field of Invention

The invention relates generally to streaming audio and video, and more specifically to combining wireless content delivery with various surfaces such as a conductive surface.

2. ART BACKGROUND

Physical infrastructures in buildings can make it difficult to run physical wiring in order to connect speakers or a video display device. Thus, the design of a room can lack functionality being void of sound systems such as stereos systems, video systems, etc. This can present a problem.

Various integrations of a mirror surface and electronic devices require controls. Mechanical controls are often associated with moving parts that can fail. This can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 12A-12B illustrates an example of a Wi-Fi module utilizing the 802.11 B/G/N standard from SAGRAD® model SG901-1059 (SG901-1059 specification sheet).

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Elements in figures are shown either larger or smaller than actual size to facilitate clarity of illustration. No absolute or relative size information should be inferred therefrom.

Figure 1A:
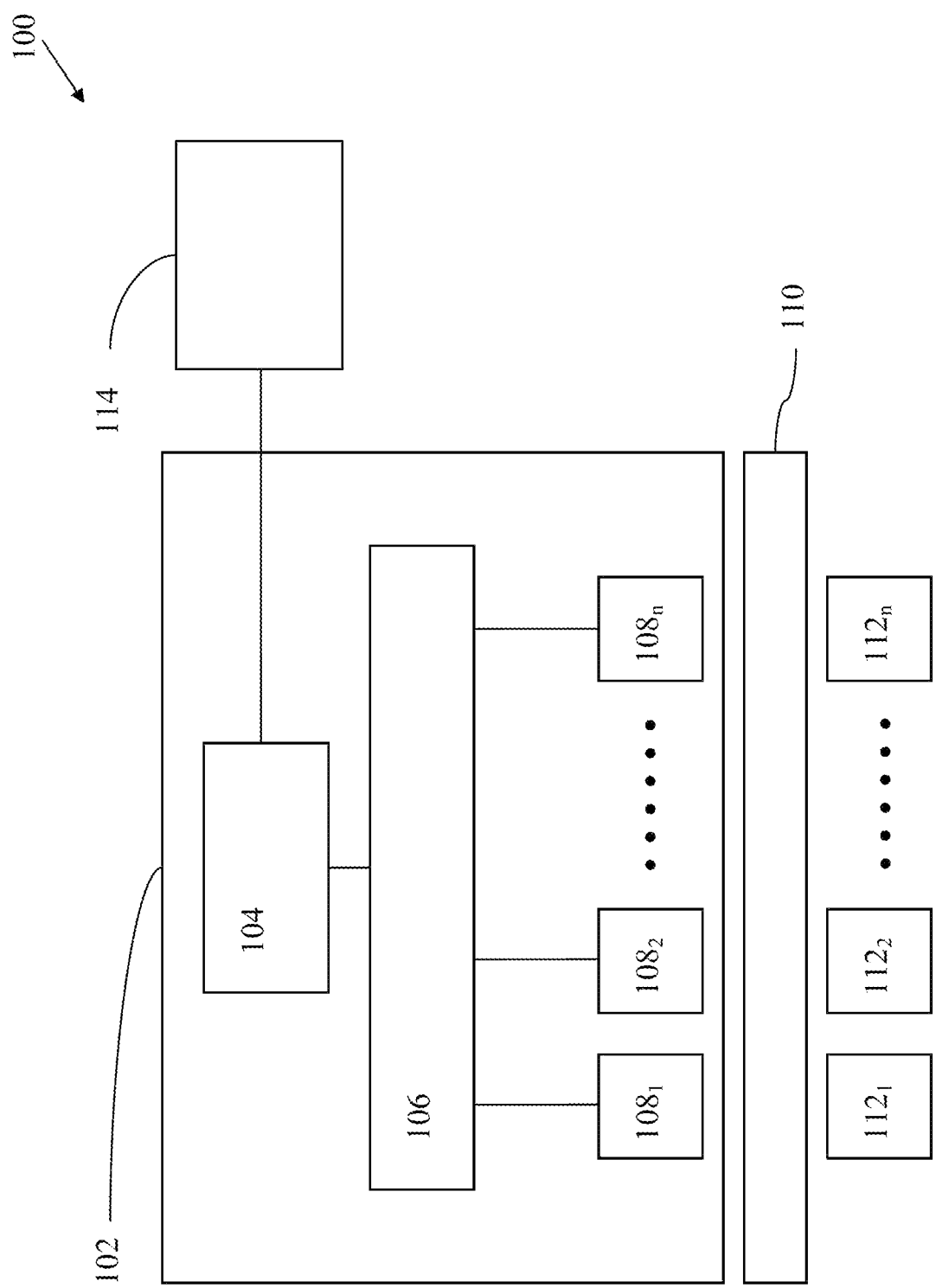
FIG. 1A illustrates a block diagram of a capacitive touch controller, according to one embodiment of the invention.

FIG. 1A illustrates a block diagram of a system, generally at 100, according to embodiments of the invention. With reference to FIG. 1A, in various embodiments, a capacitive touch control system 102 includes a micro-controller unit 104, a capacitive touch controller 106, and number of touch pads designated by $108_1$, $108_2$ up to $108_n$. Alternatively, in some configurations, the micro-controller unit 104 is combined together with the capacitive touch controller 106 into a single chip implementation. Embodiments of the invention are not limited thereby. Touch pads $108_1$, $108_2$ up to $108_n$ are configured on a circuit board as conductive areas, typically copper covered areas of the circuit board. The maximum number of touch pads used is limited by the capacitive touch controller of choice and the number of functions that a designer chooses to control with the system.

A surface is indicated at 110. The surface 110 has a conductive layer located within a thickness of the surface. The conductive layer is partitioned into a number of touch areas such as an $112_1$, an $112_2$ up to an $112_n$. The touch pads $108_1$, $108_2$ up to $108_n$, and the touch areas $112_1$, $112_2$ up to an $112_n$ are sized similarly and aligned so that touch areas are positioned over touch pads.

The micro-controller unit 104 is connected so that the capacitive touch control system can provide a signal that is used to control a desired device, such as a device 114. For example, a signal from the micro-controller unit 104 can be sent to a switch and the switch can turn on and off the desired device 114. Any desired device can be configured to be operated by the capacitive touch control system such as lights, information displays such as monitors, televisions, defoggers, etc.

Figure 1B:
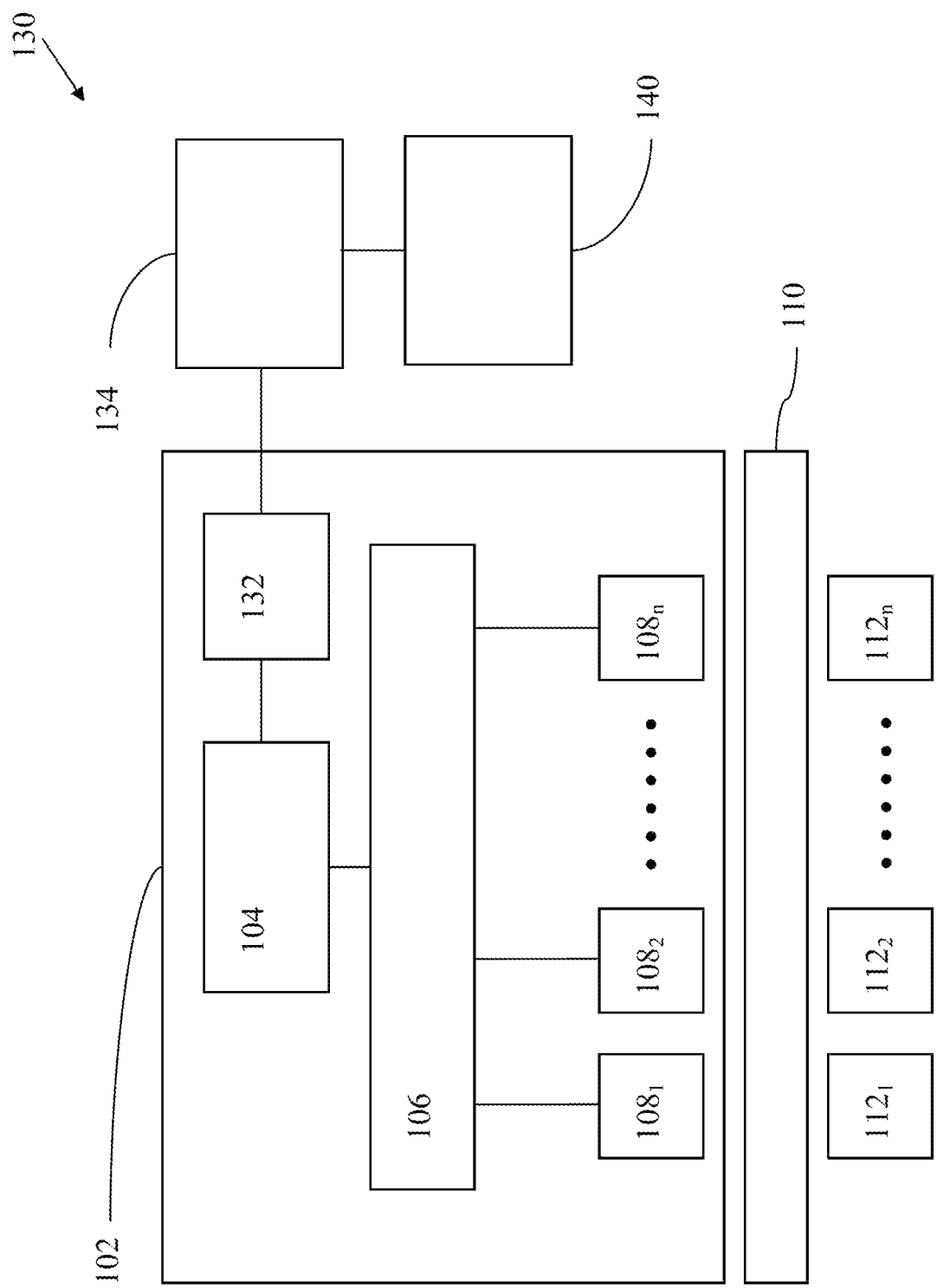
FIG. 1B illustrates another block diagram of a capacitive touch controller, according to embodiments of the invention.

FIG. 1B illustrates another block diagram of a capacitive touch controller, generally at 130, according to embodiments of the invention. With reference to FIG. 1B, the capacitive touch control system 102 is shown with the addition of an optical isolation unit 132. In some embodiments, it is desirable to isolate the capacitive touch control system 102 from the device that is being controlled. If the device that is being controlled has a high level of electrical noise, placing an optical-to-electrical link in between the micro-controller unit 104 and the external device isolates the capacitive touch control system 102 from the high noise level of the external device.

An example of a device that produces a high noise level when connected to a capacitive touch controller is a ballast control device 134 and dimmer for fluorescent lights 140. Signals from the micro-controller unit 104 are converted to optical signals and then back to electrical signals at the optical isolation unit 132. Thereby providing electrical isolation from the ballast control device 134.

Figure 1C:
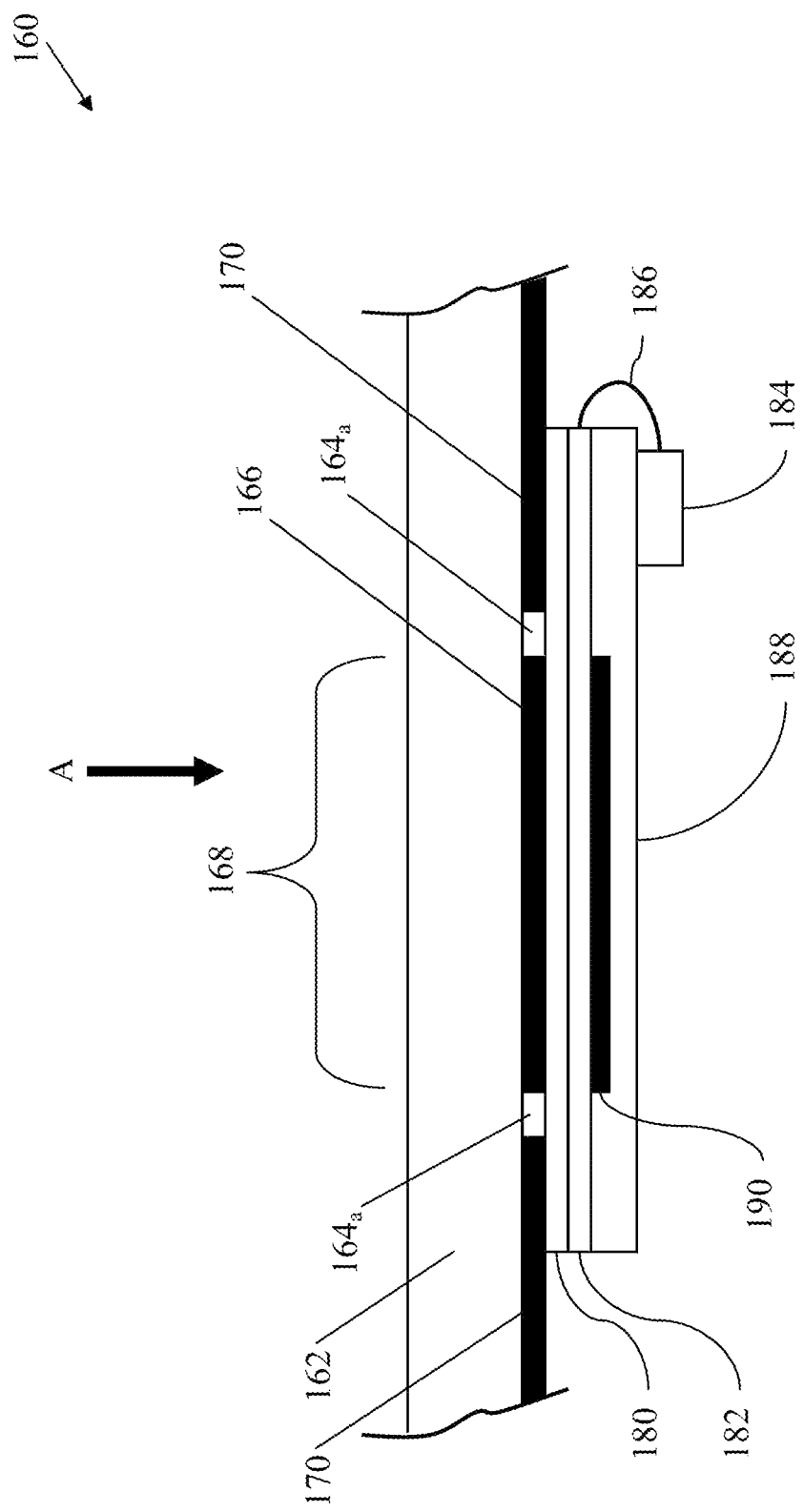
FIG. 1C illustrates a cross-section view of a capacitive touch controller and a conductive surface, according to embodiments of the invention.

FIG. 1C illustrates a cross-sectional view of a capacitive touch controller and a conductive surface, generally at 160, according to embodiments of the invention. With reference to FIG. 1C, a surface 162 extends into the plane of the figure and has two-dimensional extent similar to that illustrated with a surface 201 in FIG. 2. With reference back to FIG. 1C, the surface 162 has a conductive layer 170. A conductive layer such as 170 acts as an antenna picking up unwanted electromagnetic energy (noise) that adversely affects the capacitive touch control system by capacitively coupling this noise into the system, which can then appear as a false touch action, i.e., a false signal. The noise problem increases as the area of the conductive surface increases. As the thickness of the surface 162 increases, a signal resulting from a user touching a touch area decreases, making it hard to detect a user's touch from the background noise presented by the environment. Background noise is reduced by placing a trench 164a around a touch pad area 166 in the conductive layer 170 and, as such, partitions the conductive layer 170 into the touch pad area. Removal of the conductive layer is implied by use of the term trench. The user touches a region of the surface designated at 168 to trigger the touch pad control.

A capacitive touch control system 188 has a touch pad 190. The capacitive touch control system 188 is positioned against the surface 162 so that the touch pad area 166 is over the touch pad 190. In one embodiment, an optional source of light 184 emits light which is directed via 186 into a layer 182 located on a back side of the surface 162. In various embodiments, 186 is an array of optical fibers that directs light into the layer 182. An adhesive layer 180 attaches the optional layer 182 to the back side of the surface 162. Those of skill in the art will note that additional adhesive layers are used as needed to fix the capacitive touch control system 188 onto the back side of the surface 162. Light emitted from the layer 182 provides a source of backlight to the trenches and moats visible on a front side of the surface 162 when the surface 162 is made of a transparent or translucent material such as glass or plastic.

When a user touches the surface 162 in the region of 168, with his or her finger, the capacitive touch control system 102 outputs a signal that is used to control a device.

As described in this description of embodiments, a conductive layer can be made of any material that conducts electricity such as the reflective coating on a mirror, a metal layer, etc. The surfaces described herein, such as 162, are any surface that does not conduct electricity such as glass, wood, plastic, etc. Thus, embodiments of the invention are suited for use on mirrors. Some non-limiting examples of mirrors include mirrors both large and small and deployed in a variety of places such as in bathrooms, living rooms, kitchens, hotel rooms, etc. Mirrors containing embodiments of the invention can be used as standalone units or incorporated into a device such as a medicine cabinet. Thus, the examples given are non-limiting. Embodiments of the invention are not limited to use in any particular device but can be deployed in a variety of devices.

Figure 2:
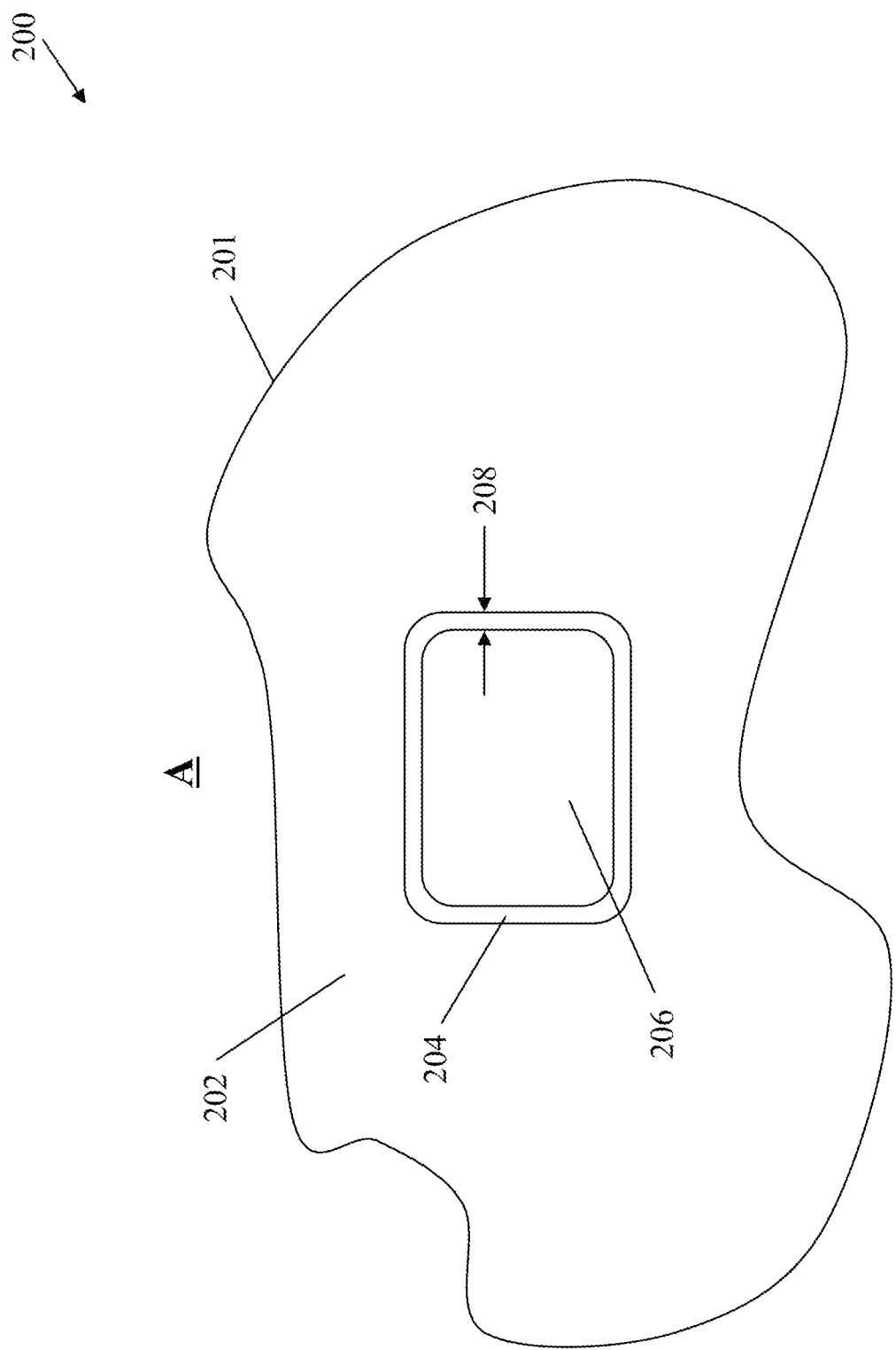
FIG. 2 illustrates partitioning a touch area, according to embodiments of the invention.

FIG. 2 illustrates partitioning a touch area, generally at 200, according to embodiments of the invention. With reference to FIG. 2, in one embodiment FIG. 2 represents a top view of FIG. 1C as indicated by reference numeral "A." A conductive layer on a surface 201 is partitioned. Before partitioning, the surface 201 had a conductive layer disposed thereon or within a thickness of the surface. FIG. 2 illustrates the result of partitioning. The conductive layer has been partitioned into a touch area 206 and a first remainder area 202, separated by a trench 204. Alternatively, the process can be thought of as isolating the touch area 206 from the rest of the conductive layer 202. The trench 204 is used to isolate the touch area 206 from the conductive layer 202. The trench has a width as indicated at 208 and represents removal of the conductive layer from the area indicated by the trench.

Figure 3:
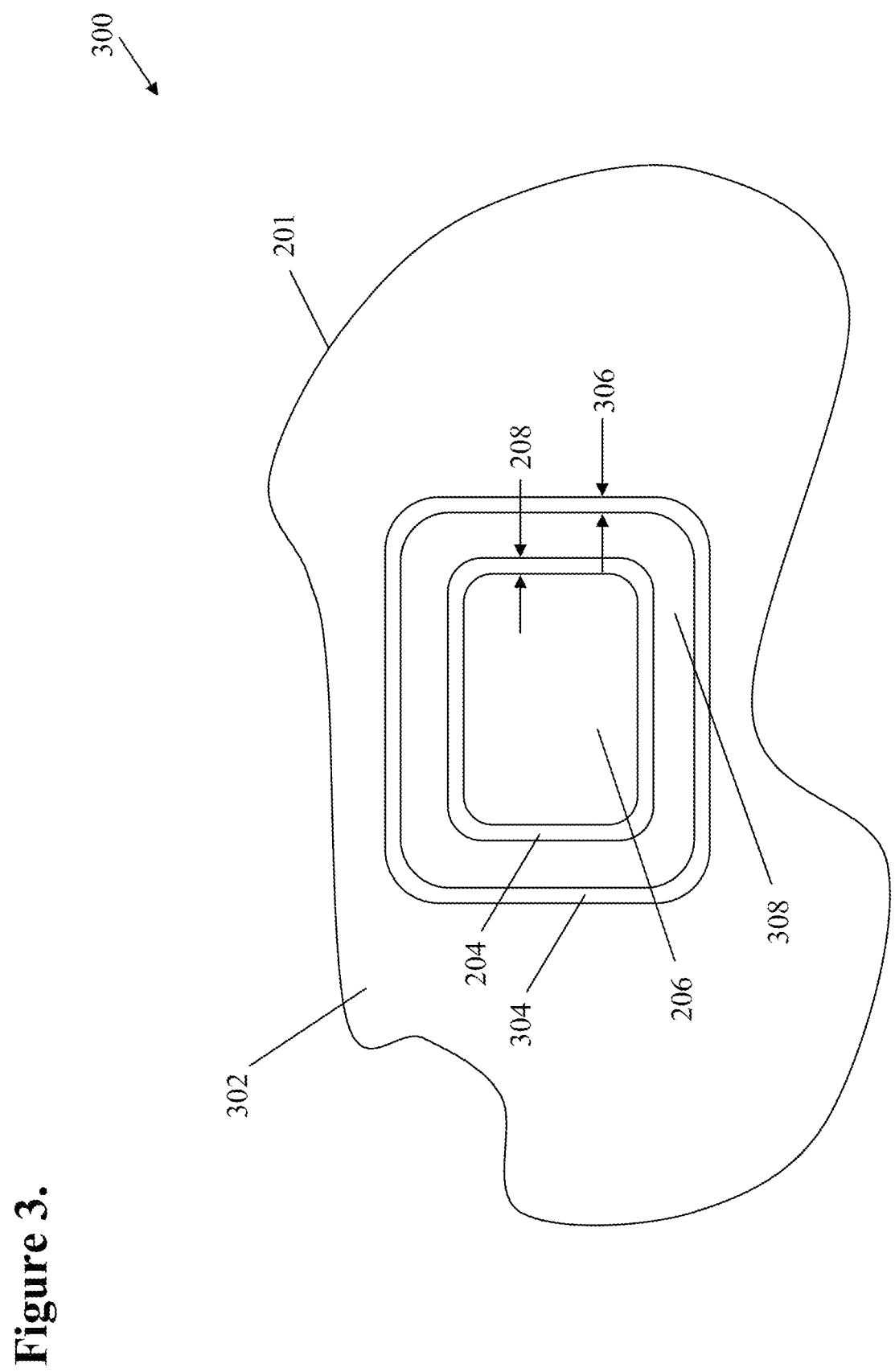
FIG. 3 illustrates partitioning a conductive area, according to embodiments of the invention.

FIG. 3 illustrates partitioning a conductive area, generally at 300, according to embodiments of the invention. With reference to FIG. 3, the surface 201 is partitioned again resulting in a second remainder area 302 and an island 308. The trench 204 creates a touch area 206 as described in FIG. 2. A moat 304 creates an island 308 and the resulting second remainder area 302 of the original conductive layer.

Figure 4:
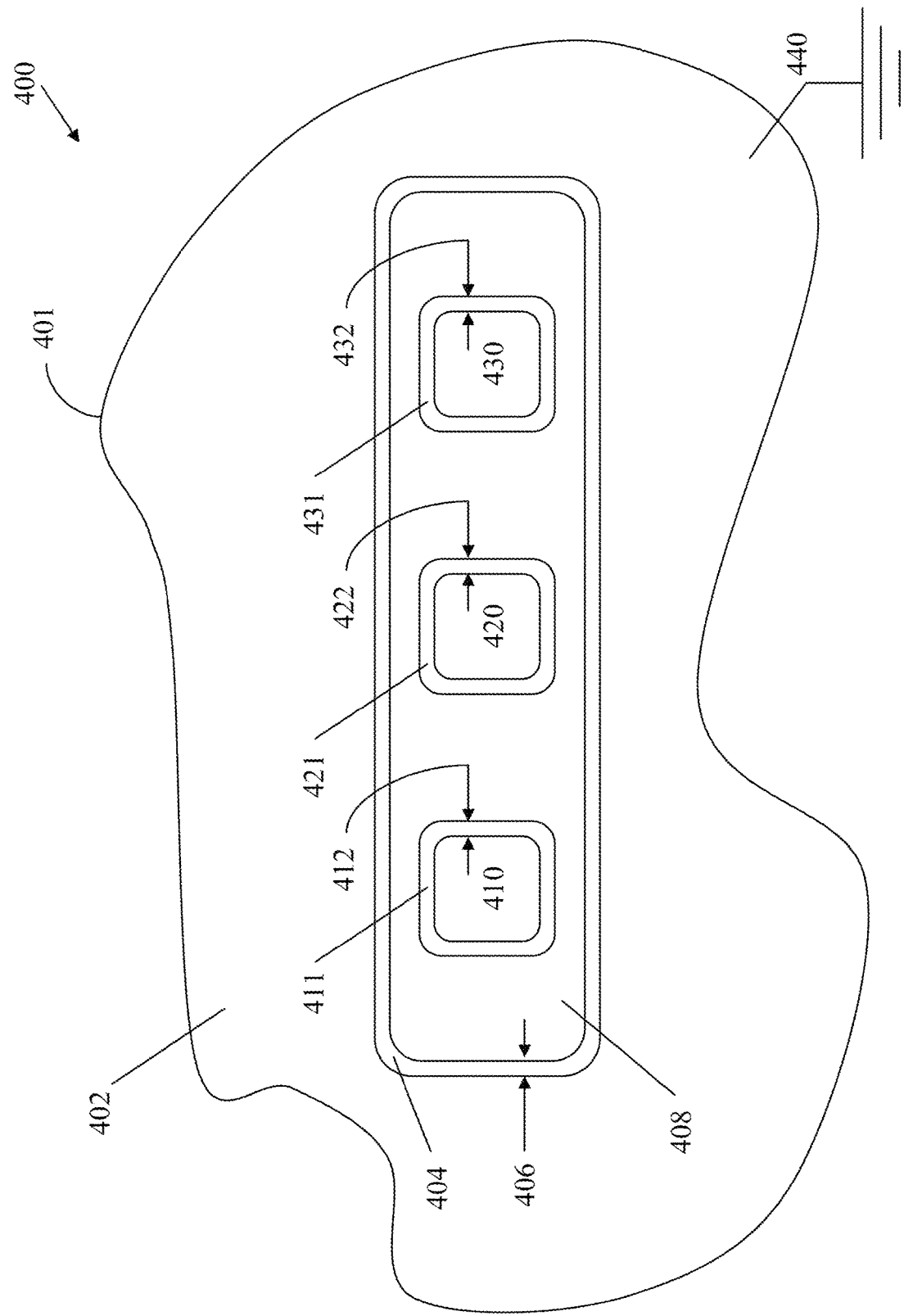
FIG. 4 illustrates multiple touch areas, according to embodiments of the invention.

The moat 304 has a thickness 306. Addition of the moat 304 to create the island 308 reduces the electrical noise picked up by the capacitive touch system that would be used with the touch area 206 in FIG. 3. In some system configurations it is advantageous to ground the remainder areas or islands such as 202 (FIG. 2), 302 (FIG. 3), 308 (FIG. 3) or 408 (FIG. 4). Bringing the remainder areas to earth ground reduces the magnitude of electrical noise that couples into the capacitive touch control system.

FIG. 4 illustrates multiple touch areas, generally at 400, according to embodiments of the invention. With reference to FIG. 4, a surface 401 has a conductive layer that has been separated into several areas. A first touch area 410 is separated by a trench 411 from an island 408. The trench 411 has a thickness indicated at 412. A second touch area 420 is separated by a trench 421 from the island 408. The trench 421 has a thickness indicated at 422. A third touch area 430 is separated from the island 408 by a trench 431. The trench 431 has a thickness indicated at 432. The remaining portion of the conductive layer after partitioning is indicated at 402. A moat 404 having a thickness indicated by 406 separates the island 408 from the larger conductive layer. An optional connection to ground is indicated at 440 between the remainder of the conductive layer 402 and earth ground. Another optional connection to ground can be made between the island 408 and earth ground.

Ground connection with a reflective layer of a mirror is accomplished by removing any protective non-conducting paint that might be applied over the conductive layer from an area approximately the size of a quarter. In one embodiment, one end of a strip of conductive copper tape is applied to this area and then the other end of the conductive copper tape is connected to any part of the mirror structure that is connected to earth ground for example a frame, cabinet, etc. It may be desirable to have more than one ground connection between the reflective area of the mirror and earth ground.

Various embodiments are used to incorporate capacitive touch control systems with surfaces having conductive layers that are large, measuring several square feet or square yards in area. Additionally, the surfaces that the capacitive touch controller is used with can be thick. For example, embodiments of the system are implemented for use with a surface made of mirror glass in excess of 6 millimeters in thickness.

For a given capacitive touch control unit, as the distance between the touch pad and the touch area increases (due to increasing surface thickness) the touch pad and touch areas should be increased in order to provide more signal to the capacitive touch controller. Increasing the sensitivity of a touch controller can also be done to sense the smaller signal resulting from the increased distance between the touch pad and the touch area.

The multiple touch areas 410, 420, and 430 are intended to permit generation of separate control signals. Therefore, it is desirable to minimize cross-talk between touch pads. The trenches 411, 421, and 431 provide capacitive isolation between touch pads. As the trench widths 412, 422, and 432 are increased, the capacitive cross-talk between touch pads is decreased. Isolation from electrical background noise that is picked up by the remainder of the conductive layer 402 is minimized by increasing the moat thickness 406.

One non-limiting example of an implementation of a capacitive touch control system with a mirror having a thickness of approximately six millimeters and an area of approximately two square meters, resulted in an island having a width of approximately 4 inches, a height of approximately 1.25 inches, a moat having a width of approximately 0.40 inch. Touch pads and touch areas of approximately 0.6 inch by 0.6 inch with trench and moat widths of 0.040 inch. Center to center spacing between touch pads of 1.3 inch. Various capacitive touch controllers can be used such as devices available from ATLab, Silicon Labs, Microchip, Cypress, ST Microelectronics, Freescale Semiconductor, Atmel, Analog Devices, and others.

Figure 5:
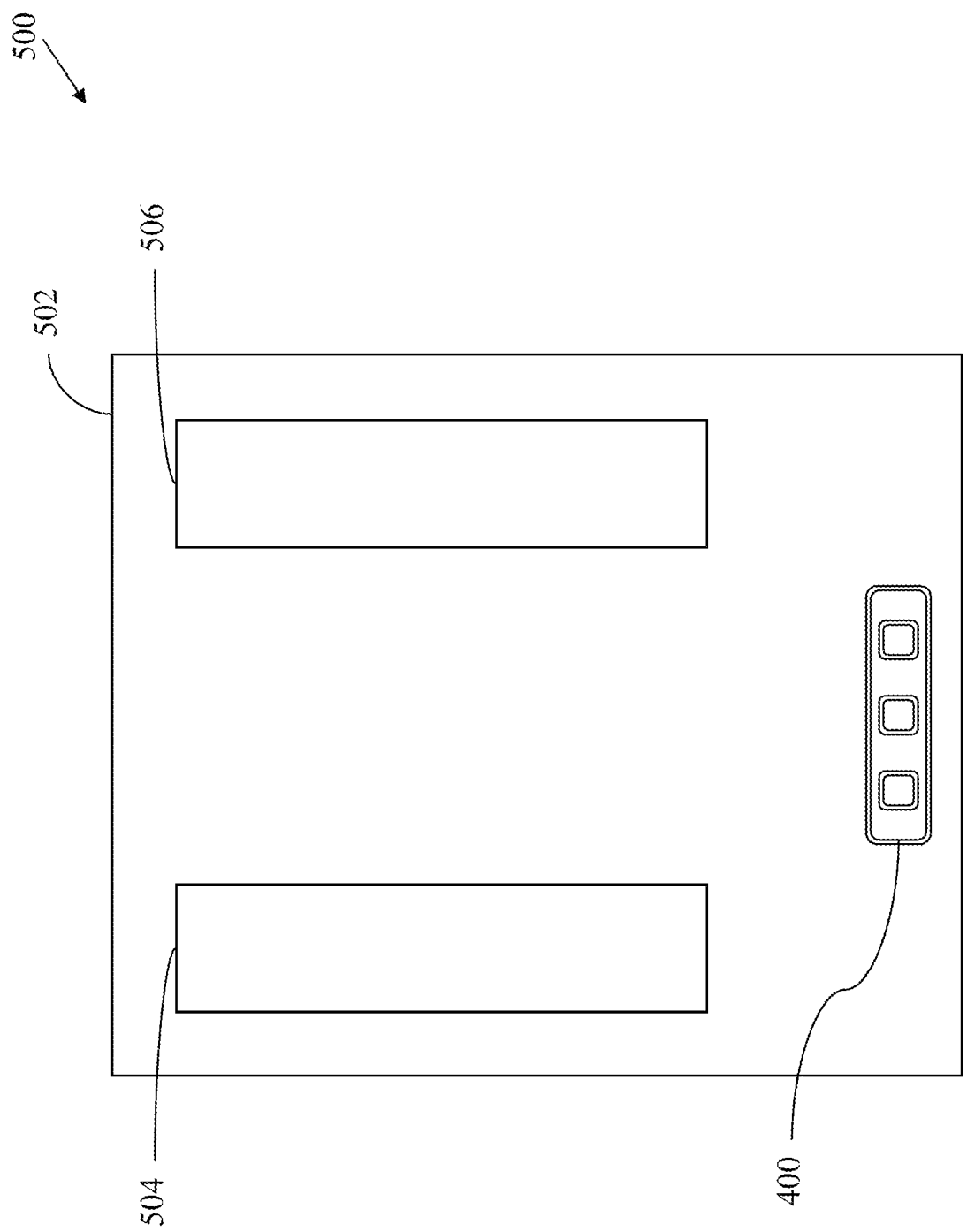
FIG. 5 illustrates a capacitive touch control with a mirror, according to embodiments of the invention.

FIG. 5 illustrates a capacitive touch control with a mirror, generally at 500, according to embodiments of the invention. With reference to FIG. 5, multiple touch areas 400 (in one embodiment, as shown in FIG. 4) are used in conjunction with a capacitive touch control system incorporated with a mirror 502. The touch control is configured to control backlight illumination within the mirror via light emitted from backlights 504 and 506.

Capacitive touch controls provide inputs to an electronic control board, attached to the backside of the mirror (described above in conjunction with the preceding figures) that perform various functionality. In various embodiments, the electronic controls can include a processor that receives inputs from the touch controls and executes predefined functions in response thereto. A user touches one of the control areas to create a change in the capacitive circuit attached to the mirror coating on the back side of the mirror. The user's touch and corresponding change in the capacitive circuit attached thereto trigger a change in an electronic component associated with the touch control. A non-limiting list of electronic components that can be controlled by the touch controls are: lighting on/off, light intensity, light intensity as modulated by the presence of a user sensed by a proximity sensor, user controllable functions associated with a media display device, such but not limited to volume, channels, power, etc.

In various embodiments, energy saving features are employed through an interactive use model with a user. For example, on power up, the built-in control brings up a light level to a value, which is less that full power, such as for example 30%, then after a period of time the control will increase light output to higher power until full power is reached. If a user lowers the power level of the light then the control will maintain that power level until the user changes it again.

A night light feature provides a low power state to save energy. The night light feature can set the amplitude of light output to as low as 1% of maximum. Night light amplitude is also user definable using the controls on the capacitive touch pad.

If a user brings the amplitude below 30%, for example to 5% the light output stays at 5%. A proximity sensor senses whether a user is within a predefined distance of the mirror and lowers the light if a user is not within the predefined range.

Percentages and values listed herein are given for illustration only. Embodiments of the invention are not limited thereby.

Figure 6A:
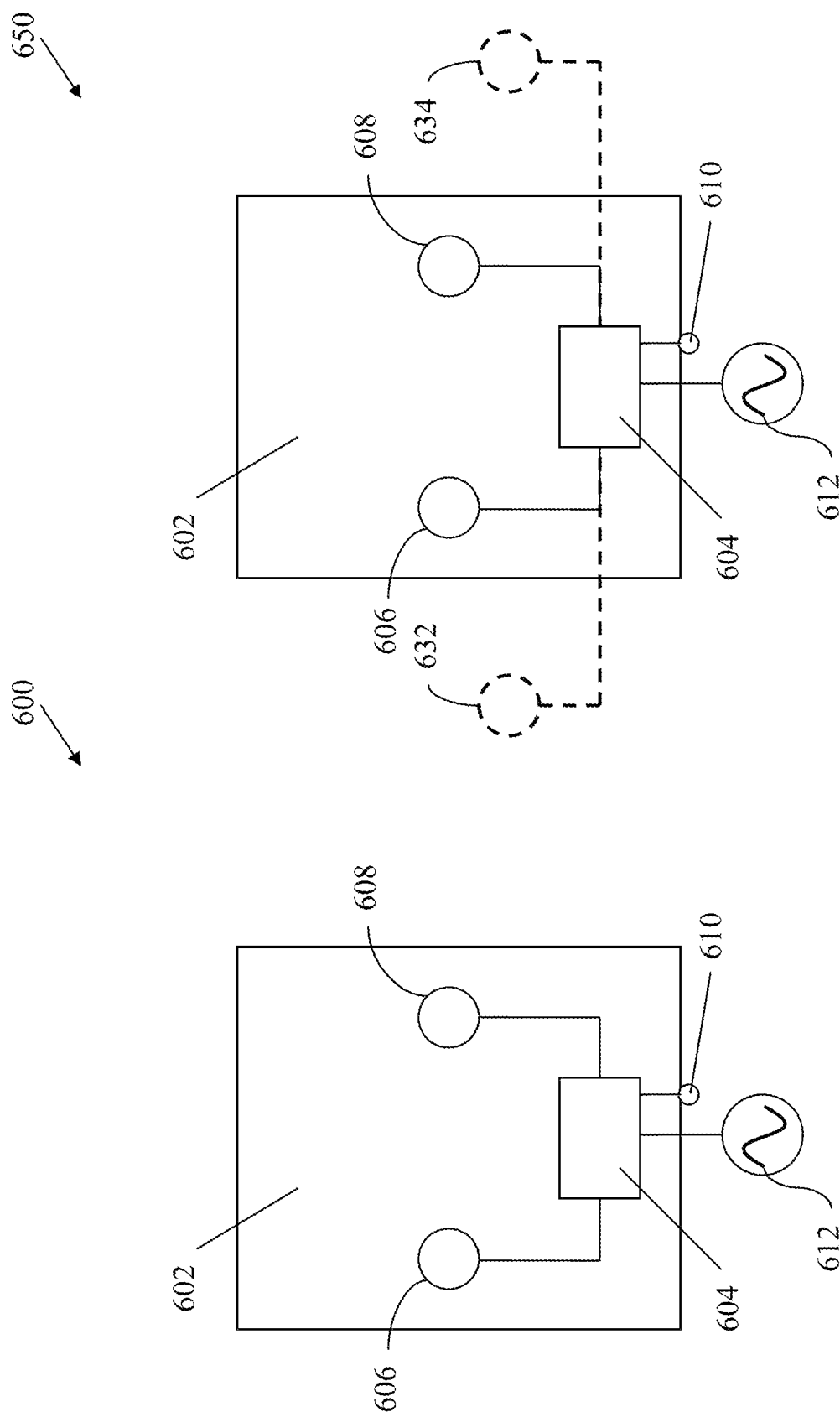
FIG. 6A illustrates a wirelessly enabled content delivery device, according to embodiments of the invention.

FIG. 6A illustrates, generally at 600 and 650 wirelessly enabled content delivery devices, according to embodiments of the invention. With reference to FIG. 6A, the wirelessly enabled content delivery device 600 has a surface, which has a back side indicated at 602. A wireless data system is indicated at 604. The wireless data system 604 is configured to receive electrical power at 612. The source of electrical power 612 can be for example alternating current nominally available at 110 volts (AC) in North America or 220 volts AC or 240 volts AC commonly available in Europe.

The wireless data system 604 is configured to receive a stream of content from a user's device as described below in conjunction with FIG. 6B. The stream of content can be an audio stream, a video stream, or an audio/video stream. As used in this description of embodiments, "content" is understood to mean any of an audio stream, or a video stream, or an audio/video stream. In one embodiment, a stream of content is an audio stream which is processed by the wireless data system and provided to speakers at 606 and 608. An optional microphone, indicated at 610 is used to receive audio signals acoustically and to then feed the audio to the wireless data system 604 for streaming back to the user's device (described below in FIG. 6B).

A wirelessly enabled content delivery device is shown at 650. Optional speakers 632 and 634 can be configured in addition to the speakers 606 and 608. In some embodiments, optional speakers 632 and 634 are used in place of speakers 606 and 608. In yet other embodiments, a single speaker can be used such as one of 606 or 608. Similarly, in some embodiments, a single speaker can be used such as one of 632 or 634.

Figure 6B:
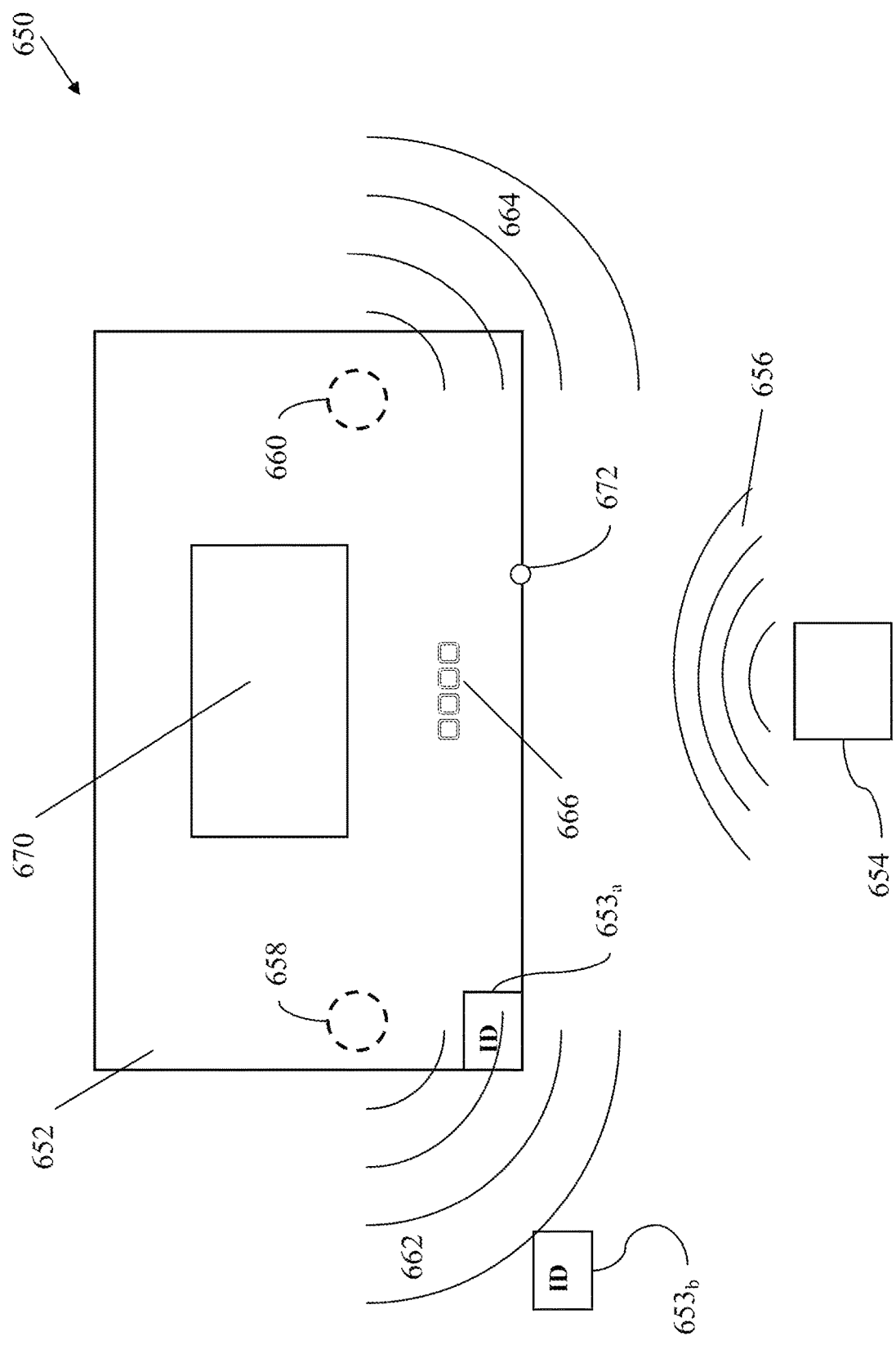
FIG. 6B illustrates a wirelessly enabled content delivery device and a user device, according to embodiments of the invention.

FIG. 6B illustrates, generally at 650, a wirelessly enabled content delivery device and a user device, according to embodiments of the invention. With reference to FIG. 6B, the wirelessly enabled content delivery device 650 has a front side shown at 652. A user device 654 provides a source of content. Associated with the front side 652 is a visual identifier 653*a*. The visual identifier 653*a* is typically within view of the user of the user device 654 and identifies the wirelessly enabled content delivery device 650 from a plurality of such devices in situations where such a plurality exists. A visual identifier can be placed in a variety of locations relative to a wirelessly enabled content delivery device. One location is shown by placement of 653*a*. Another location is shown where a visual identifier 653*b* is not physically on the front side 652 but is close enough to the wirelessly enabled content delivery device 650 so that a user knows that the identifier is associated therewith. In some embodiments, the only wirelessly enabled content delivery device which appears on the user device 654 is wirelessly enabled content delivery device 650.

In various embodiments, a user device 654 is a wirelessly enabled phone, a wirelessly enabled tablet computer, a wirelessly enabled desktop computer or a user defined wirelessly enabled device. In various embodiments, a user device that contains wireless content streaming functionality such as provided by the Bluetooth communication protocols can be used in conjunction with a system employing a wireless data module 704 (FIG. 7A), described below, which is designed to implement the Bluetooth communication protocols.

As content is streamed (as indicated at 656) from the user device 654 the wireless transmission is received by a wireless data system such as 604 (FIG. 6A) and the audio is broadcast, as indicated by 662 and 664, through speakers 658 and 660, which are mounted, in some embodiments, on a back side of the wirelessly enabled content delivery device as shown in FIG. 6A. In some embodiments, video is streamed from the user device 654 to the wirelessly enabled content delivery device 650. The video is displayed on a video display such as a display shown at 670. In some embodiments, one or more touch areas are shown at 666. The touch areas have been described in the figures above and are also described in the figures below. When touched by a user, touch areas provide signals that are received by a touch controller and then in turn cause the system to react, such as for example, cycling power for the wirelessly enabled content delivery device, breaking an existing pairing connection, change volume, adjust video, etc.

A microphone 672 is located on or near the wirelessly enabled content delivery device 650.

Figure 7A:
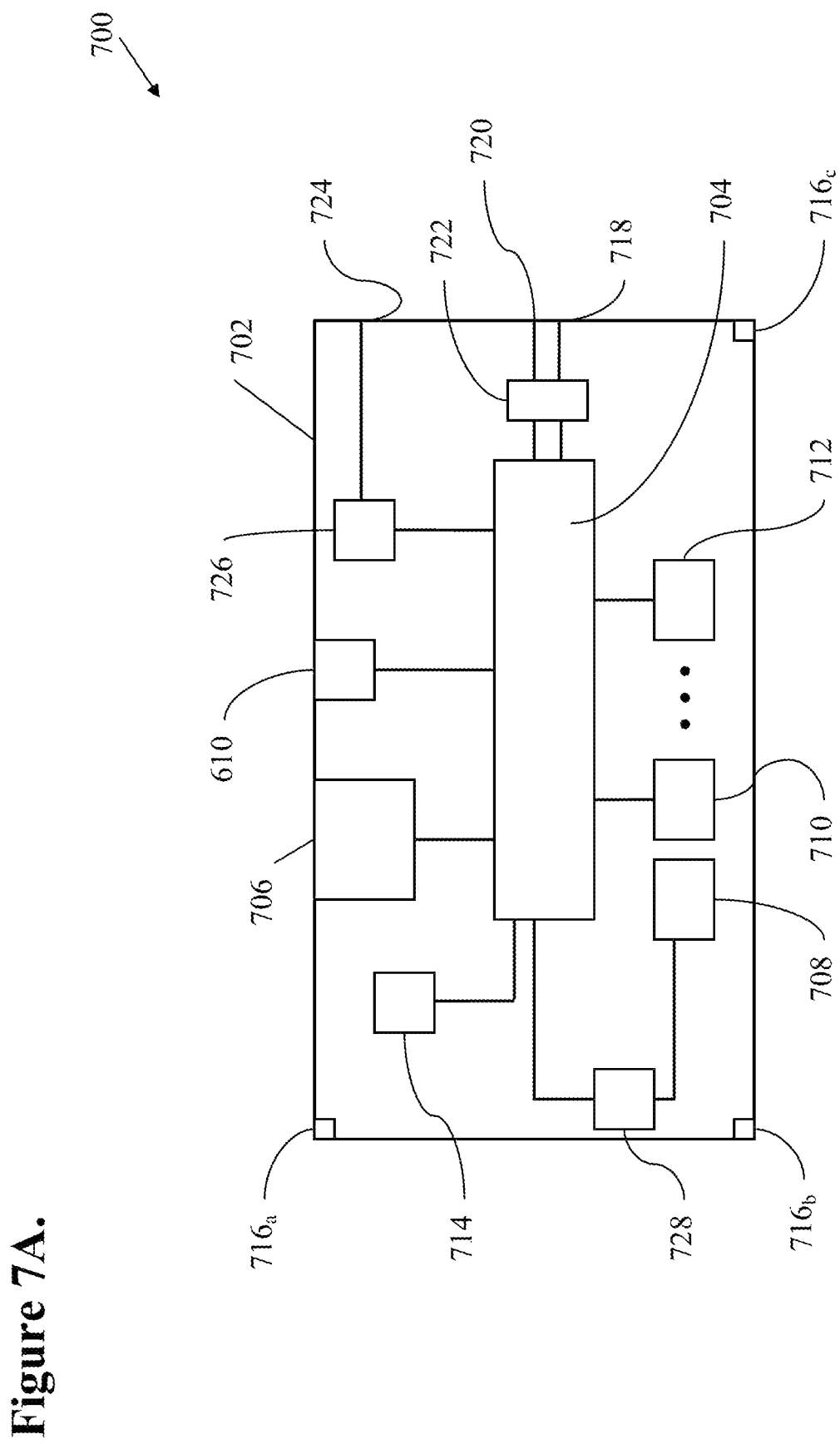
FIG. 7A illustrates a wireless data module and associated components according to embodiments of the invention.

FIG. 7A illustrates, generally at 700, a wireless data module and associated components according to embodiments of the invention. With reference to FIG. 7A, a wireless data system 702 includes a wireless data module 704. One or more touch sensing integrated circuits 708, 710, and 712 are configured to change parameters associated with the wireless data module 704. Power for the wireless data system 702 is provided at 728. An antenna 706 receives wirelessly transmitted content and provides a signal input to the wireless data module 704. A microphone 610 can provide an alternate signal input to the wireless data module 704 for audio signals. The wireless data module 704 has two channels of audio output (stereo) as indicated at 718 (left audio) and 720 (right audio). 718 and 720 are connected to speakers such as 606 and 608 (FIG. 6A) or 658 and 660 (FIG. 6B). When a wireless data module is configured to receive video, the video is output at 724 and can be connected to a video display such as the display 670 (FIG. 6B). The wireless data module 704 is programmed using a port 714.

In some embodiments, the wireless data system 702 can include an audio amplifier such as is indicated at 722. In some embodiments, a video interface can be included as is indicated at 726. In some embodiments, the components described in conjunction with the wireless data system 702 are installed on a printed circuit board (PCB).

Figure 12A:
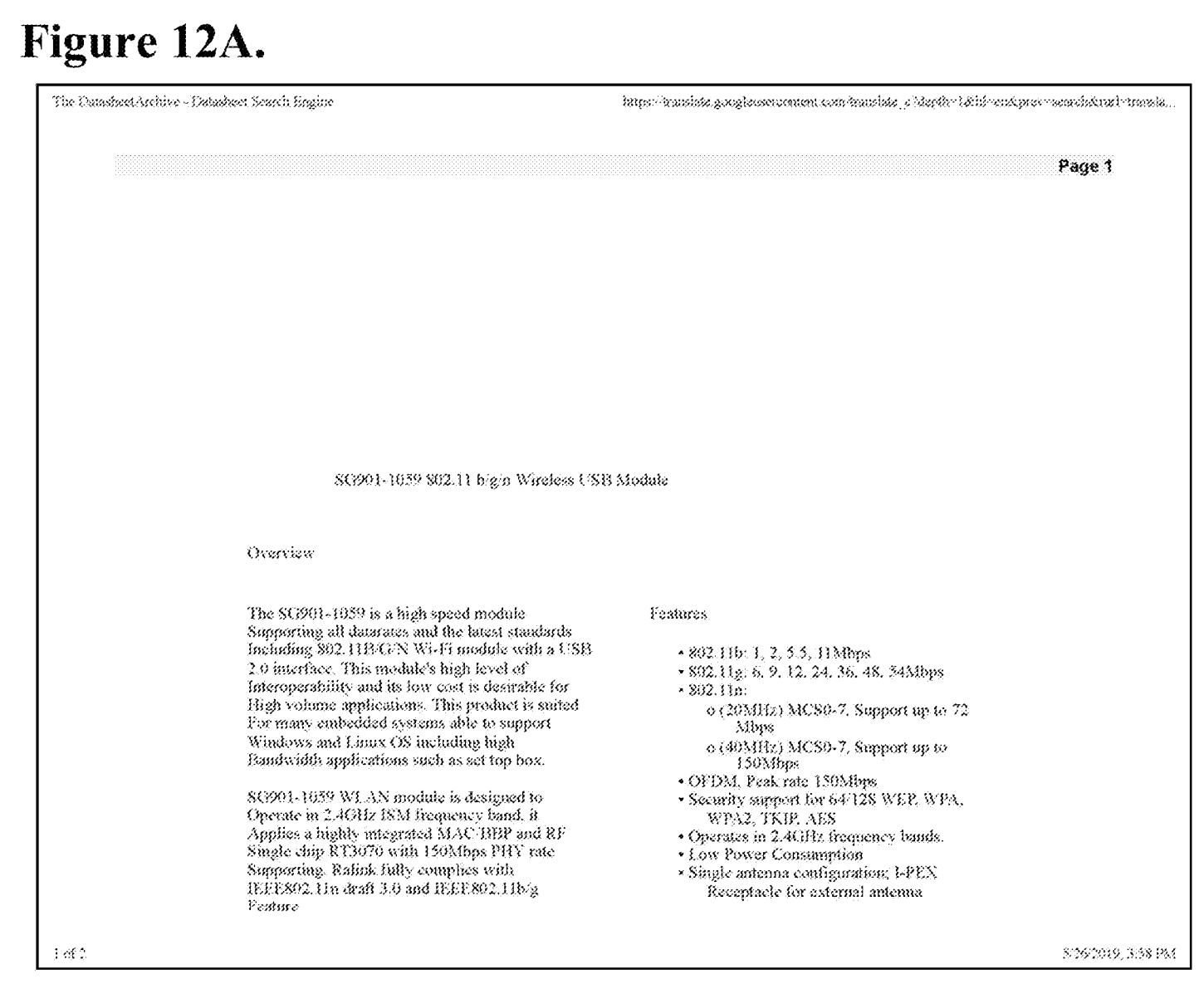
Figure 12B:
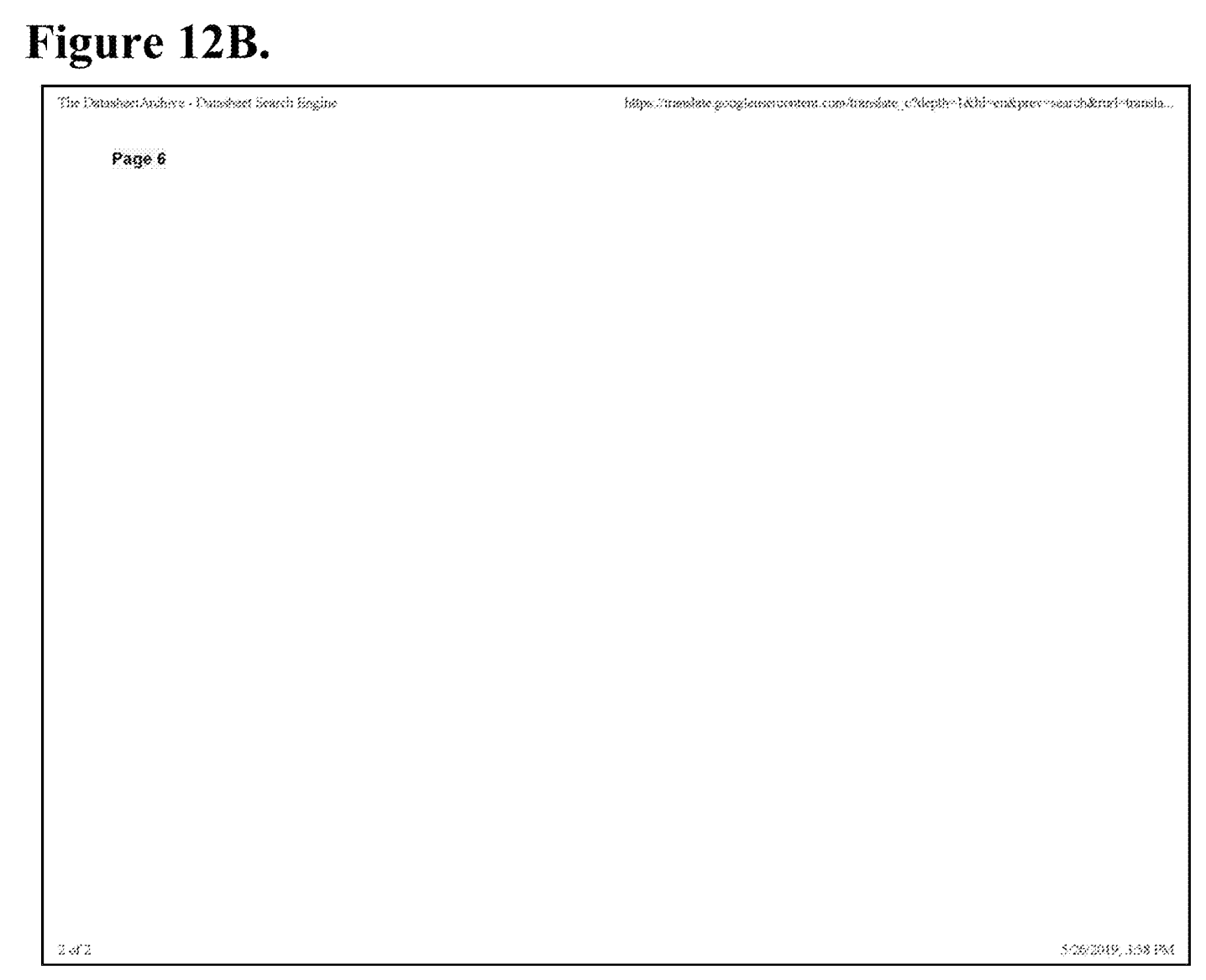

In various embodiments the wireless data module 704 is a module designed to implement the Bluetooth communication protocol. In one embodiment, the wireless data module is a BlueGiga® WT-32 Bluetooth streaming audio module. In another embodiment when audio and video are streamed the wireless data module is, for example, a SAGRAD® SG901-1059 which operates with a higher data rate, utilizing an 802.11 B/G/N Wi-Fi module. FIG. 12A-12B illustrates an example of a Wi-Fi module utilizing the 802.11 B/G/N standard from SAGRAD" model SG901-1059 (SG901-1059 specification sheet).

Protocols other than Bluetooth can be implemented in the system for audio streaming, such as for example, IRAD® (Infrared Data Association) IRAD-4M protocol which provides a data transfer rate of 3 megabits/see (MB/s). An example of a wireless data module 704 built using this protocol is a Vishey® TFDU6300.

In various embodiments, the wireless data module 704 is implemented in an integrated circuit device, which may include an integrated circuit package containing the integrated circuit. In some embodiments, the wireless data module 704 is implemented in a single integrated circuit die. In other embodiments, the wireless data module 704 is implemented in more than one integrated circuit die of an integrated circuit device which may include a multi-chip package containing the integrated circuit.

In some embodiments, the audio power amplifier 722 provides stereo output at 10 watts per channel. In some embodiments a line output is also provided on the wireless data system 702. The line output is used to power external speakers such as those shown in FIG. 6A at 632 and 634. In some embodiments, capacitive touch controllers such as those from Atmel® or other sources are used at 708, 710, and 712. In one embodiment, the Atmel® AT42QT1010 touch sensing integrated circuit is used for 708, 710, and 712. In one embodiment, a touch sensing integrated circuit 708 provides a logic level input to a reset-set (RS) flip flop to cycle the power for the system. A toggle transition by the user will either enable or disable power. In one or more embodiments, a touch sensing integrated circuit 710 provides a logic level input to the wireless data module 704 to initiate pairing. In one or more embodiments, a touch sensing integrated circuit 712 provides a logic level input to the wireless data module 704 to raise the resulting output volume and the output volume can also be lowered using touch sensing integrated circuits such as 712. In one or more embodiments, battery power is provided to maintain data integrity within the wireless data module 704, such as identifier, pairing information, etc. In one or more embodiments, the battery is a Lithium Polymer (LiPo) battery with a capacity of 180 milliamp hour to 250 milliamp hour. In one or more embodiments, the programming port 714 uses the UART (universal asynchronous receiver/transmitter) protocol with the iWrap5 programming language. In various embodiments, logic (not shown) is provided to cause light emitting diodes (LEDs) to illuminate, blink, etc. to indicate such system functions as power on, pairing status, etc. In various embodiments, power is converted and regulated through the use of the power unit 728 to provide system power through the use of switching power converts as is known to those of skill in the art.

In various embodiments, the wireless data system 702 is implemented in an integrated circuit device, which may include an integrated circuit package containing the integrated circuit. In some embodiments, the wireless data system 702 is implemented in a single integrated circuit die. In other embodiments, the wireless data system 702 is implemented in more than one integrated circuit die of an integrated circuit device which may include a multi-chip package containing the integrated circuit.

In some embodiments, a series of ground points 716a, 716b, and 716c are used to ground the wireless data system 702. In some embodiments, when the wireless data system 702 is used with capacitive touch areas on a surface and one or more capacitive touch controllers, the wireless data system 702 is grounded to one of the conductive layers. When a mirror is used with capacitive touch areas and one or more capacitive touch controllers, the wireless data system 702 is grounded to the silver backing of the mirror glass.

Figure 7B:
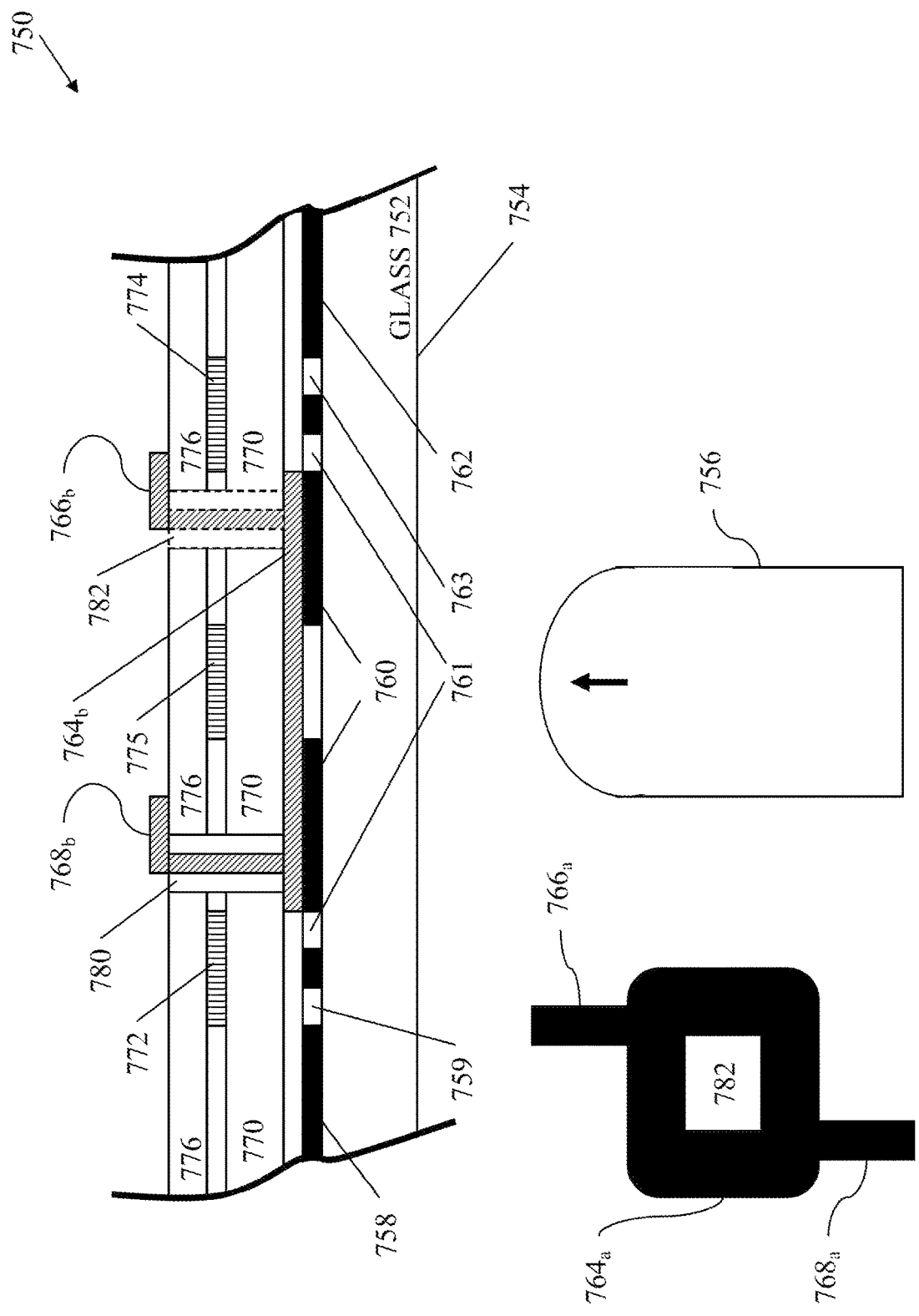
FIG. 7B illustrates a cross-sectional view of a surface according to embodiments of the invention.

FIG. 7B illustrates, generally at 750, a cross-sectional view of a surface according to embodiments of the invention. With reference to FIG. 7B, the surface 750 includes a layer of glass 752. The layer of glass 752 has a front side 754. The surface is configured with a capacitive touch area, such that when a user touches a finger 756 to the front side 754 a logic state of the capacitive touch sensor is changed, as described in conjunction with the figures above.

Also, as described in conjunction with the figures above, mirror silvering is selectively removed from one or more trench areas, for example, 759, 761, and 763, thereby defining one or more touch areas, such as, a touch area 760 and adjacent touch areas 758 and 762. A touch pad (conductive pickup) 764a has tabs 766a and 768a. The touch pad 764a is placed over the touch area 760 as shown at 764b. A layer of transparent or translucent material is placed over the trench areas and touch pad areas, which functions as a light pipe and is indicated at 770. On top of the light pipe 770 are placed light emitting diodes (LEDs) 772 and 774. The LEDs produce light which passes through the trench areas to produce a pattern when viewed from the front side of the surface 754. An example of such a pattern is seen below in FIG. 7C. An electronics board, such as a printed circuit board or the like 776 is positioned as shown on a back side of the light pipe 770 and LED layer. Through holes (vias) 780 and 782 pass through the electronics board 776 and the light pipe 770. The vias allow the tabs from the touch pad to pass there through and make contact on the electronics board 776. In the example of FIG. 7B, the tab 768a passes through the via 780 and makes electrical contact with the electronics board at a contact 768b. The tab 766a passes through the via 782 and makes contact with the electronics board 776 at a contact 766b.

In one or more embodiments, a touch pad such as 764a is made of 0.0075 inch brass flat stock with a 30uIN Brite nickel finish. The touch pad can have a central hole indicated at 782 to permit light from the light pipe 770 to pass through, thereby providing illumination of an icon placed within a region defined by a touch area, e.g., 760. An example of such icons can be seen in FIG. 7C at 704b, 706b, 708b, and 710b.

Such a configuration of capacitive touch controls permits the functionality described above in conjunction with the system and a wireless data module, such as powering on off, creating pairing, adjusting volume of audio broadcast up, adjusting volume of audio broadcast down, adjusting appearance of video displayed, etc.

Figure 7C:
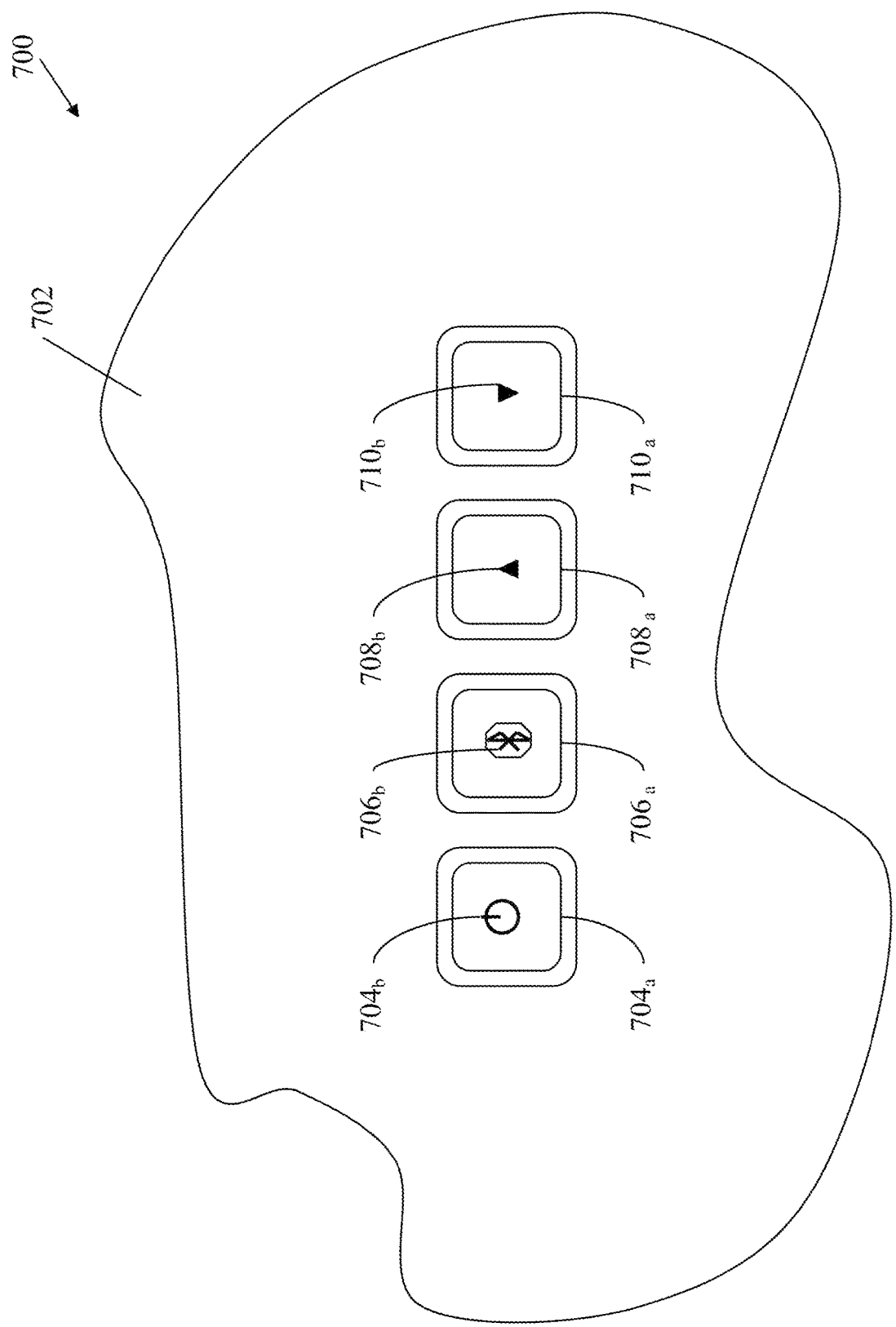
FIG. 7C illustrates a surface configured with touch areas according to embodiments of the invention.

FIG. 7C illustrates, generally at 700, a surface configured with touch areas according to embodiments of the invention.

With reference to FIG. 7C, a surface is indicated at 702. The surface 702 can be a surface within a wirelessly enabled content delivery device. In various embodiments, the surface contains a layer of mirror glass which has been processed, as described in the figures above, to create touch areas for capacitive touch controls. Four touch areas for their associated capacitive touch controls are shown in FIG. 7C, at 704a, 706a, 708a, and 710a. However, in various embodiments, fewer controls can be provided or more controls can be provided. In one embodiment the touch areas shown in FIG. 7C can be implemented in the wirelessly enabled content delivery device of FIG. 6B as shown at 666. In some embodiments, a wirelessly enabled content delivery device is provided without any touch areas or capacitive touch controls.

A size of a touch area can vary as described in conjunction with the figures above. In one embodiment, a touch area measures 0.59 inch by 0.59 inch with a 0.065 inch trench surrounding the touch area. This size is provided merely as an example of a touch pad and does not limit embodiments of the invention. An icon 704b is located on the touch area 704a such as an icon 704b which indicates system power. An icon 706b is located on the touch area 706a and indicates pairing. An icon 708b is located on the touch area 708a and indicates volume up. An icon 710b is located on the touch area 710a and indicates volume down.

In various embodiments, lighting for the touch areas is provided by LEDs such as 772 and 774 shown in FIG. 7B, which provide illumination for trenches 759, 761, and 763. Lighting is controlled by system logic and the colors selected for the LEDs. In one embodiment, backlight is enabled simultaneously with system power and provides white light. In one embodiment, touch area icons, such as icons 704b, 706b, 708b, and 710b are illuminated with blue light. LED 775 (FIG. 7B) provides illumination for the touch icon associated with touch area 760. Light from LED 775 passes through the central hole 782 in touch pad 764a thereby illuminating the touch area as seen from a front side of a surface as shown in FIG. 7C.

In one embodiment, system logic provides for the functionality to power up lights on a surface during system power up. For example, on power up of the wireless data system, which in one embodiment is accomplished by pressing system power touch area 704a (FIG. 7C) backlights such as 504 and 506 (FIG. 5) power up. In addition to or in the alternative, the wireless data system powers up one or more auxiliary lights, this can be a room light such as a desk light, night light, etc. When the wireless data system is incorporated into an object such as art glass, designer glass, ceramic, wall panels, etc. one or more lamps can be connected thereto and be powered up by the wireless data system. In this way, content can be streamed to wirelessly enabled content delivery devices which can provide audio and or video broadcast and operation of lights without requiring audio video cabling, etc.

When the touch areas with backlight and lighted touch area icons are used in conjunction with areas of a mirror designed to appear and vanish, such as a video or data display which disappears into the mirror when in an off state the touch areas can be designed to disappear and reappear as well.

Figure 8:
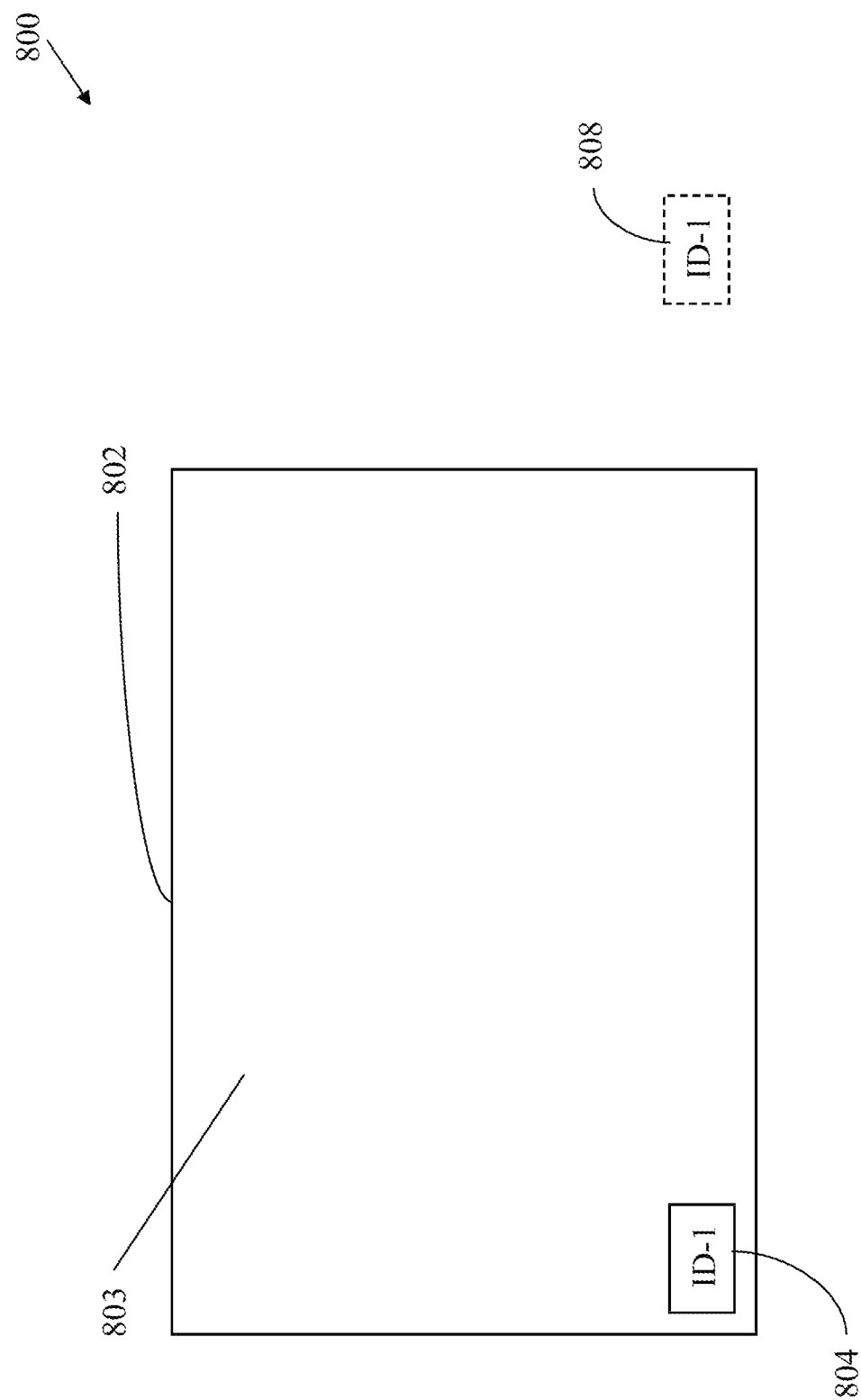
FIG. 8 illustrates a wirelessly enabled content delivery device with an associated identifier according to embodiments of the invention.

FIG. 8 illustrates, generally at 800, a wirelessly enabled content delivery device with an associated identifier according to embodiments of the invention. With reference to FIG. 8, a wirelessly enabled content delivery device is shown at 802. The wirelessly enabled content delivery device has a front side as shown at 803. As shown in FIG. 8, the wirelessly enabled content delivery device 802 does not have any touch areas provided. However, in other embodiments, touch areas are provided such as for example as shown in FIG. 6B and FIG. 7C above.

Several locations for an identifier that is associated with the wirelessly enabled content delivery device 802 are illustrated within FIG. 8. For example, the identifier can be placed on the wirelessly enabled content delivery device 802 as shown at 804. Alternatively, or in conjunction with 804, an identifier can be placed in a location as shown in 806. Thus, an identifier can exist in one or more places. The identifier assists a user to identify a wirelessly enabled content delivery device to which the user wishes to stream content.

In various embodiments, a wirelessly enabled content delivery device and a user device can be paired, for wireless streaming of content, by powering up the wirelessly enabled content delivery device, as in a cold reset where pairing information is erased. One example of powering up (cold reset) is for example by switching power on from an external wall switch. When the system powers up it enters pairing mode and is available for pairing with a user device. To complete pairing the user selects the particular wirelessly enabled content delivery device from a list displayed on the user device (described below in conjunction with FIG. 11) of available devices within range of the user device. In one or more embodiments, a capacitive touch control is configured into the system to work in conjunction with a wireless data module (such as 704 in FIG. 7A), such that when a user touches a touch area of a wirelessly enabled content delivery device such as 706a (FIG. 7C) current pairing is broken and the system enters pairing mode again. When in paring mode, a user can now pair a user device with the wirelessly enabled content delivery device.

In yet another scenario, in some embodiments, the system enters sleep mode after streaming is idle for a preset time. While in sleep mode the system conserves power maintains data in processor memory for example random access memory (RAM) or synchronous dynamic random access memory (SRAM) (e.g., in wireless data module 704 from FIG. 7A). When exiting sleep mode, the system powers up, while retaining the pairing it was in when it entered sleep mode, thus the system is available for streaming with the user device. Note that the functionality described directly above can be varied according to the particular embodiment implemented within a wirelessly enabled content delivery device. For example, sleep mode can be used to retain pairing even when a wireless data system is powered directly from a wall switch. In such a configuration, when the system is powered down from the wall switch, data is retained in memory by means of the local battery power supplied on the wirelessly enabled content delivery device. No limitation is implied by the particular examples given and these examples are given merely for illustration.

Figure 9A:
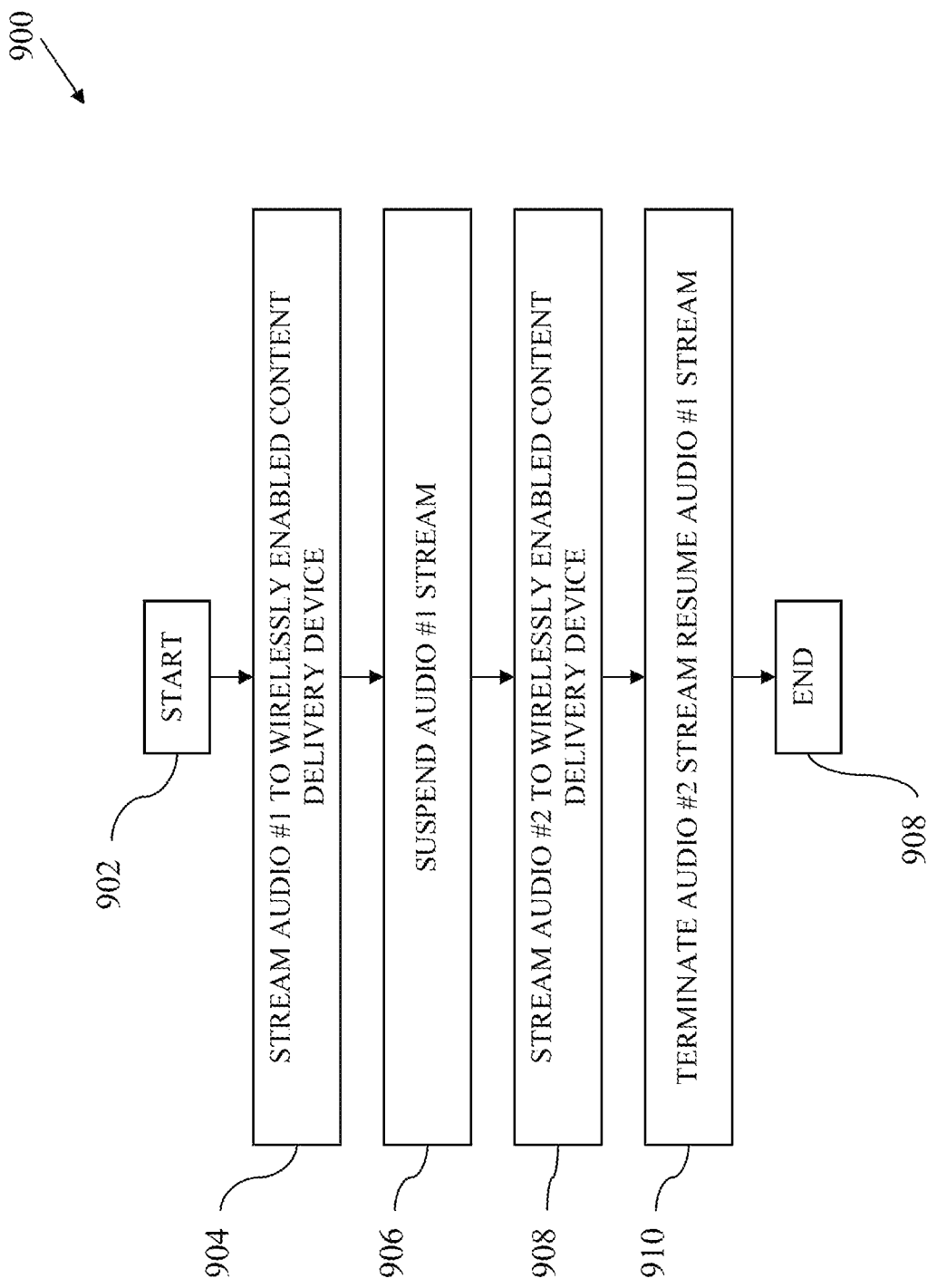
FIG. 9A illustrates a method for interrupting audio streaming according to embodiments of the invention.

FIG. 9A illustrates, generally at 900, a method for interrupting audio streaming according to embodiments of the invention. With reference to FIG. 9A, a process starts at a block 902. At a block 904 a stream of content starts between a user device and a wirelessly enabled content delivery device. The stream of content can be, for example in one embodiment, an audio stream from the user device to the wirelessly enabled content delivery device.

A user can suspend the audio stream at a block 906 and switch to a second audio stream at a block 908. For example, a user could start off streaming music at the block 904 from the user's device. Then an incoming telephone call to the user device can be streamed in place of the music content at a block 908. In this mode, the telephone call is streamed to the wirelessly enabled content delivery device and broadcast for the user to hear. A microphone associated with the wirelessly enabled content delivery device picks up the user's voice and provides for a duplexed stream of audio content to and from the user device and the wirelessly enabled content delivery device.

At a block 910 the second audio stream can be interrupted and the first audio stream can be resumed, for example the stream of music content form the user's device resumes when the user terminates the phone call.

Figure 9B:
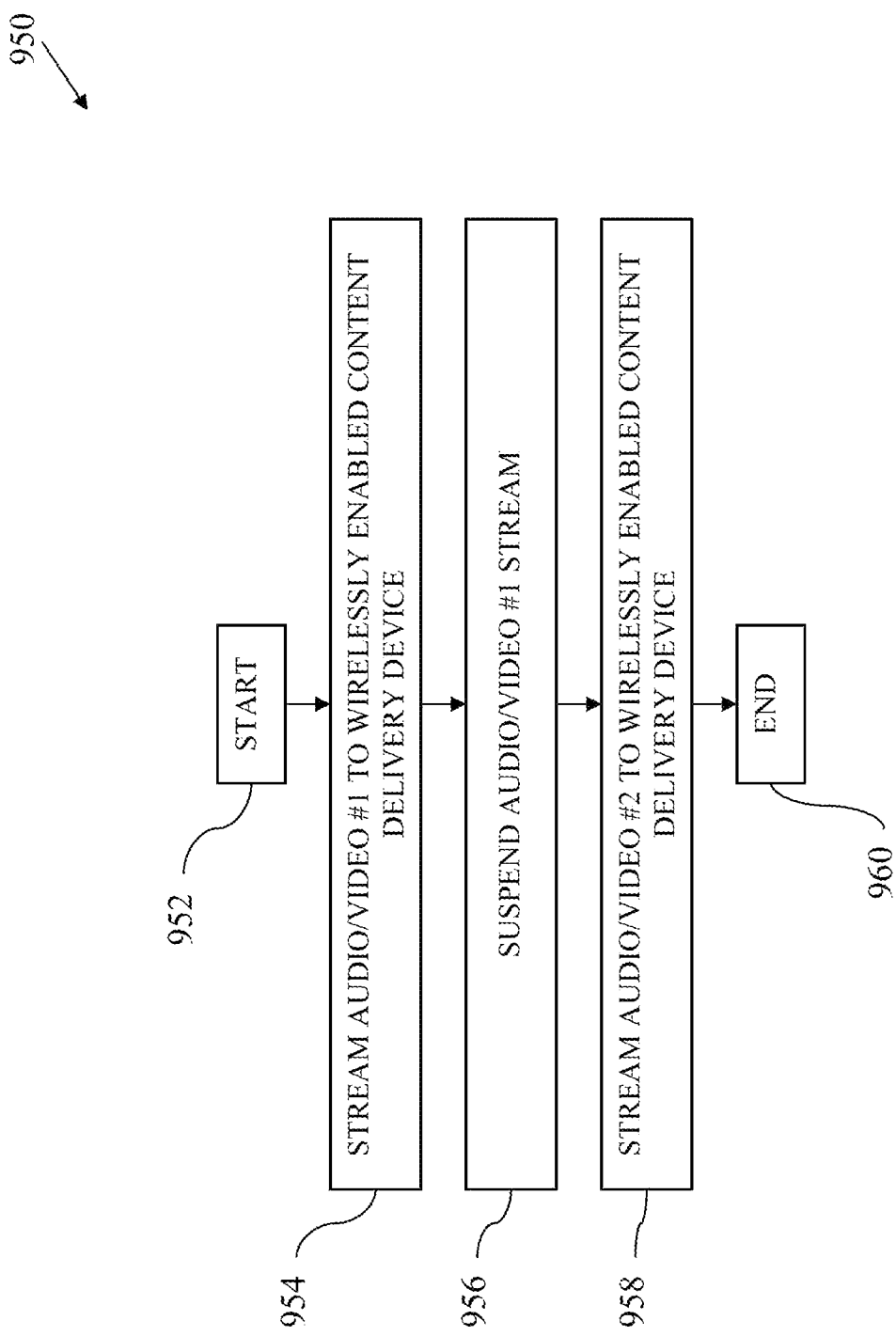
FIG. 9B illustrates a method for interrupting audio/video content streaming according to embodiments of the invention.

FIG. 9B illustrates, generally at 950, a method for interrupting audio/video content streaming according to embodiments of the invention. With reference to FIG. 9B, a process starts at a block 952. At a block 954 a first stream of audio/video content is streamed from a user device to a wirelessly enabled content delivery device. At a block 956 the first stream of audio/video is suspended. At a block 958 a second stream of audio/video content is commenced between the user device and the wirelessly enabled content delivery device. The process stops at a block 960. Changing between a first audio/video stream and a second audio/video stream can occur as a user changes from one source of content to another on the user's device. Changing between a first audio/video stream and a second audio/video stream can occur as a user switches between for example a stream of a movie and a stream of a video call.

Figure 10:
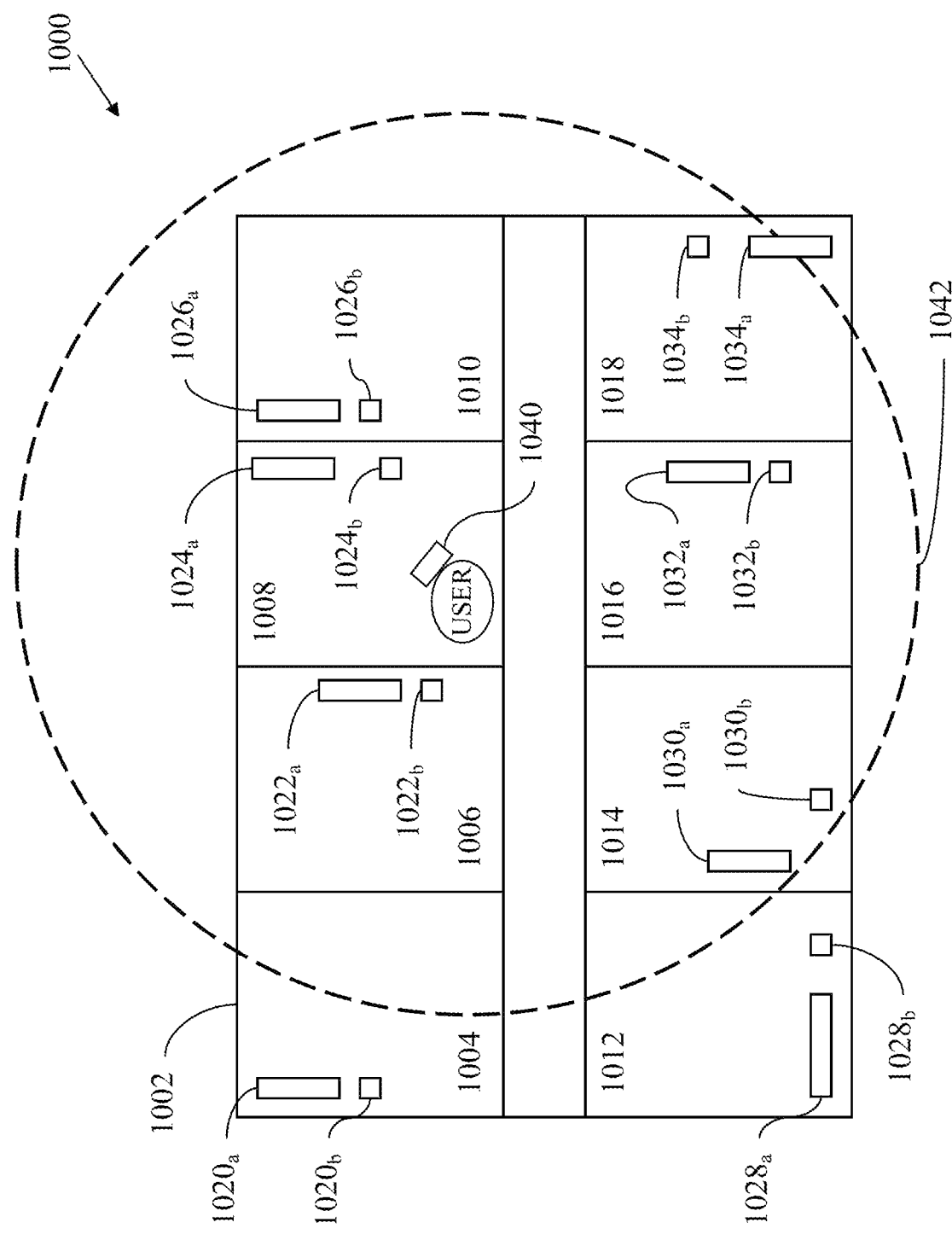
FIG. 10 illustrates a plurality of wirelessly enabled content delivery devices according to embodiments of the invention.
Figure 11:
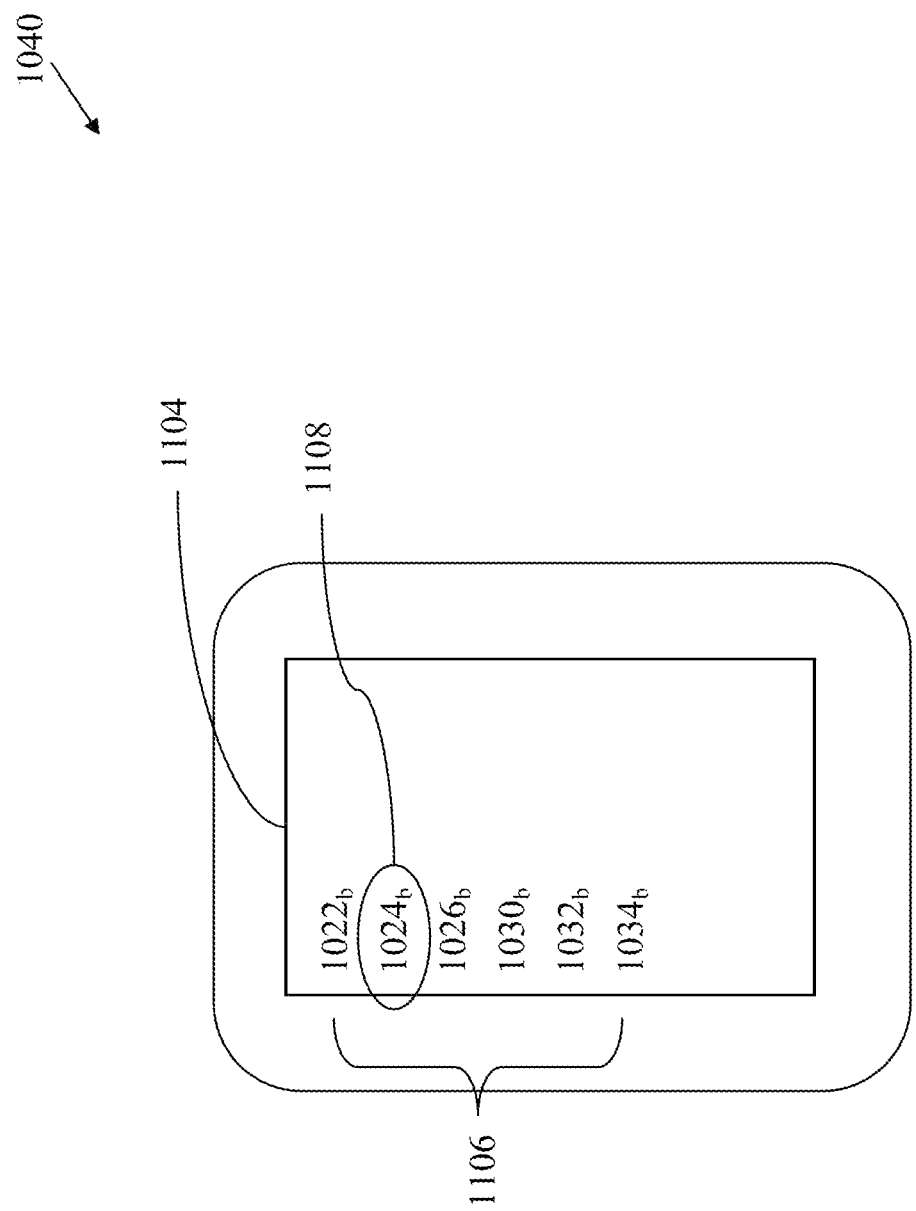
FIG. 11 illustrates selecting an associated wirelessly adapted media display device from a plurality of wirelessly enabled content delivery device according to embodiments of the invention.

FIG. 10 illustrates, generally at 1000, a plurality of wirelessly enabled content delivery devices according to embodiments of the invention. FIG. 11 illustrates selecting an associated wirelessly enabled content delivery device from a plurality of wirelessly enabled content delivery devices according to embodiments of the invention. With reference to FIG. 10 and FIG. 11, a hospitality environment 1002 includes a plurality of rooms, such as hotel rooms, motel rooms, bedrooms, suites, conference rooms, etc. as indicated by 1004, 1006, 1008, 1010, 1012, 1014, 1016, and 1018. Within each room, one or more wirelessly enabled content delivery devices, such as for example, 1020a, 1022a, 1024a, 1026a, 1028a, 1030a, 1032a, and 1034a are located. Each wirelessly enabled content delivery device has one or more identifiers associated therewith, such as for example, 1020b, 1022b, 1024b, 1026b, 1028b, 1030b, 1032b, and 1034b.

A user is shown in the room 1008 with a user device 1040. Depending on the implementation of a system and wireless data module (e.g., 704 in FIG. 7A) a number of potential wirelessly enabled content delivery devices will be within range of the user's device 1040 and will appear as available for pairing with the user device 1040. For example, when the Bluetooth communication protocol is implemented, the user device will have a range of approximately 10 to 30 meters. Such a range is hypothetically indicated, in one embodiment, by a circle 1042. Within range of the circle 1042 are six different wirelessly enabled content delivery devices. With reference to FIG. 11, the user device 1040 is shown with the six potential wirelessly enabled content delivery devices 1106, that are available for pairing, presented on a device display at 1104. The user sees an identifier 1024b in the room 1008 which is associated with the wirelessly enabled content delivery device 1024a and then selects 1108 from the list of potential wirelessly enabled content delivery device 1106. Selection of 1108 pairs the user device 1040 and the wirelessly enabled content delivery device 1024a together enabling content to be streamed there between.

As used in this description of embodiments, a wirelessly enabled content delivery device includes a mirror, such as a wall mounted mirror, a free standing mirror, such as a floor standing device or a device configured for use on a table or dresser. A wirelessly enabled content delivery device also includes a wall mounted panel, such as a panel used as a room divider, or a panel that embodies or is a piece of art work. In yet other embodiments, a wirelessly enabled content delivery device is a piece of art glass or ceramic art. Streaming of audio content to such a device creates a sound system within existing items within a room thereby eliminating the need to run separate wires for speakers and enabling a user to play personal audio content within the room.

As used in this description of embodiments, a hospitality environment is understood to mean any one or more of a bed and breakfast, a hotel setting, a motel setting, a conference center setting, a civic center setting, etc.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Non-transitory machine-readable media is understood to include any mechanism for storing information (such as program code, etc.) in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described but can be practiced with modification and alteration within the spirit and scope of the appended claims. The description is thus to be regarded as illustrative instead of limiting.

What is claimed is:

1. A wirelessly enabled mirror adapted for use in an indoor environment with a user device, comprising:
    a mirror, the mirror has a front side and a back side, the mirror is configured to be used in the indoor environment;
    a wireless data system, the wireless data system includes a wireless data module, the wireless data system is fixed to the back side of the mirror, the wireless data module is configured to communicate with the user device and to receive wireless data from the user device; and
    a data output interface, the data output interface is coupled with the mirror, the data output interface is configured to receive data from the wireless data module, the wirelessly enabled mirror is configured to receive a primary source of electrical power from the indoor environment.

2. The apparatus of claim 1, wherein the data is audio data.

3. The apparatus of claim 2, wherein the data includes audio data and video data.

4. The apparatus of claim 1, wherein the indoor environment is selected from the group consisting of a bathroom, a living room, a kitchen, a hotel room, a motel room, a bedroom, a suite, and a conference room.

5. The apparatus of claim 1, wherein the data output interface is a speaker.

6. The apparatus of claim 5, wherein the data output interface includes a video display.

7. The apparatus of claim 3, wherein the audio data and video data area part of a movie.

8. The apparatus of claim 1, wherein the wireless data module conforms to Wi-Fi protocol.

9. The apparatus of claim 1, wherein the wireless data module conforms to Bluetooth communication protocol.

10. The apparatus of claim 1, wherein the user device is selected from the group consisting of a telephone, a tablet computer, a computer, and a user defined device.

11. A method to operate a wirelessly enabled mirror with a user device, comprising:
    providing a primary source of electrical power from an indoor environment to a wireless data system, wherein the wireless data system is associated with a mirror, and the mirror is used proximate to a room of the indoor environment;
    receiving, at the wireless data system, wireless data from the user device;
    deriving at the wireless data system, data from a wireless stream of data; and
    transforming the data into audio signals, wherein the audio signals are used to drive a speaker.

12. The method of claim 11, wherein the transforming includes transforming the data into video signals and the video signals are displayed on a video display and the video display is incorporated with the mirror.

13. The method of claim 12, wherein the audio signals and the video signals are a part of a movie.

14. The method of claim 12 wherein the room is selected from the group consisting of a bathroom, a living room, a kitchen, a hotel room, a motel room, a bedroom, a suite, and a conference room.

15. The method of claim 11, wherein the wireless data system conforms to Wi-Fi protocol.

16. The method of claim 11, wherein the wireless data system conforms to Bluetooth communication protocol.

17. The method of claim 11, wherein the user device is selected from the group consisting of a telephone, a tablet computer, a computer, and a user defined device.

18. A wirelessly enabled mirror, comprising:
a mirror, the mirror has a front side and a back side, the mirror is configured to be used with a building;
a wireless data system, the wireless data system includes a wireless data module, the wireless data system is fixed to the back side of the mirror, the wireless data module is configured to communicate with a user device and to receive data from the user device wirelessly; and
a video display, the video display is coupled with the mirror and is configured to receive data from the wireless data module, wherein the data is derived from a wireless stream of audio data and video data, the wirelessly enabled mirror is configured to receive a source of electrical power from the building.

19. The device of claim 18, wherein the video display is located within a portion of the mirror.

20. The device of claim 19, wherein the data derived from the wireless stream of audio data and video data is a part of a movie.

21. The device of claim 19, wherein the wirelessly enabled mirror further comprises an audio speaker.

22. The device of claim 18, wherein the wireless data module conforms to Bluetooth communication protocol.

23. The device of claim 18, wherein the wireless data module conforms to Wi-Fi protocol.

24. The device of claim 18, wherein the user device is selected from the group consisting of a telephone, a tablet computer, a computer, and a user defined device.

25. The device of claim 18, wherein the building includes a room selected from the group consisting of a bathroom, a living room, a kitchen, a hotel room, a motel room, a bedroom, a suite, and a conference room and the wirelessly enabled mirror is configured for use in the room.

26. A wirelessly enabled mirror, comprising:
a mirror, the mirror has a front side and a back side, the mirror is configured to be used in an indoor environment associated with a building;
a wireless data system, the wireless data system includes a wireless data module, the wireless data system is fixed to the back side of the mirror, the wireless data module is configured to communicate with a user device and to receive data from the user device wirelessly; and
a video display, the video display is coupled with the mirror and is configured to receive data from the wireless data module, wherein the data is derived from a wireless stream of audio data and video data, the wirelessly enabled mirror is configured to receive a source of electrical power from the building.

27. The device of claim 26, wherein the video display is located within a portion of the mirror.

28. The device of claim 27, wherein the data derived from the wireless stream of audio data and video data is a part of a movie.

29. The device of claim 27, wherein the wirelessly enabled mirror further comprises an audio speaker.

30. The device of claim 26, wherein the wireless data module conforms to Bluetooth communication protocol.

31. The device of claim 26, wherein the wireless data module conforms to Wi-Fi protocol.

32. The device of claim 26, wherein the user device is selected from the group consisting of a telephone, a tablet computer, a computer, and a user defined device.

33. The device of claim 26, wherein the building includes a room selected from the group consisting of a bathroom, a living room, a kitchen, a hotel room, a motel room, a bedroom, a suite, and a conference room and the wirelessly enabled mirror is configured for use in the room.

\* \* \* \* \*